US012608848B2

(12) United States Patent
Dela Rosa et al.

(10) Patent No.: US 12,608,848 B2
(45) Date of Patent: Apr. 21, 2026

(54) SIMILAR CONTENT AUGMENTATIONS SYSTEM

(71) Applicant: Snap Inc., Santa Monica, CA (US)

(72) Inventors: Kevin Sarabia Dela Rosa, Seattle, WA (US); Hao Hu, Bellevue, WA (US); Yanjia Li, Torrance, CA (US)

(73) Assignee: Snap Inc., Santa Monica, CA (US)

( * ) Notice: Subject to any disclaimer, the term of this patent is extended or adjusted under 35 U.S.C. 154(b) by 305 days.

(21) Appl. No.: 18/338,980

(22) Filed: Jun. 21, 2023

(65) Prior Publication Data

US 2024/0428470 A1    Dec. 26, 2024

(51) Int. Cl.
| | |
|---|---|
| *G06T 11/00* | (2006.01) |
| *G06F 3/0482* | (2013.01) |
| *G06T 7/60* | (2017.01) |
| *G06V 10/74* | (2022.01) |
| *G06V 10/77* | (2022.01) |

(Continued)

(52) U.S. Cl.
CPC ............ *G06T 11/00* (2013.01); *G06F 3/0482* (2013.01); *G06T 7/60* (2013.01); *G06V 10/761* (2022.01); *G06V 10/7715* (2022.01); *G06V 10/776* (2022.01); *G06V 20/20* (2022.01); *G06T 2200/24* (2013.01); *G06T 2207/20081* (2013.01)

(58) Field of Classification Search
CPC ....... G06T 11/00; G06T 7/60; G06T 2200/24; G06T 2207/20081; G06F 3/0482; G06F 3/04842; G06F 3/04845; G06V 10/761; G06V 10/7715; G06V 10/776; G06V 20/20; G06V 10/82; G06N 3/08
See application file for complete search history.

(56) References Cited

U.S. PATENT DOCUMENTS

| | | |
|---|---|---|
| 10,410,138 B2 | 9/2019 | Maor et al. |
| 12,477,163 B2 | 11/2025 | Dela Rosa et al. |

(Continued)

FOREIGN PATENT DOCUMENTS

WO    WO-2018141942 A1    8/2018

OTHER PUBLICATIONS

"AWS re:Invent 2019: Build accurate training datasets with Amazon SageMaker Ground Truth (AIM308)", [Online] Retrieved from the Internet: <URL: https://www.youtube.com/watch?v=6WJxzKsIFKA>, (Dec. 5, 2019), 1 pg.

(Continued)

*Primary Examiner* — Edward Martello
(74) *Attorney, Agent, or Firm* — Schwegman Lundberg & Woessner, P.A.

(57) ABSTRACT

Described is a system for identifying content augmentations based on an interaction function initiated by a user by determining an initiation of an interaction function from a first user of an interaction system, processing data associated with the interaction function using a first machine learning model to generate a feature vector, and identifying at least one recommended content augmentation based on a comparison of the feature vector for the interaction function to a feature vector for the at least one recommended content augmentation. The system then displays the at least one recommended content augmentation to the first user with a corresponding selectable user interface element for individual recommended content augmentations.

20 Claims, 15 Drawing Sheets

(51) Int. Cl.
G06V 10/776 (2022.01)
G06V 20/20 (2022.01)

(56) References Cited

U.S. PATENT DOCUMENTS

| | | | |
|---|---|---|---|
| 2012/0208166 A1 | 8/2012 | Ernst et al. | |
| 2014/0176603 A1* | 6/2014 | Kumar | G06F 3/011 |
| | | | 345/633 |
| 2017/0262633 A1 | 9/2017 | Miserendino et al. | |
| 2019/0258900 A1 | 8/2019 | Baikadi et al. | |
| 2020/0012962 A1 | 1/2020 | Dent et al. | |
| 2020/0372715 A1* | 11/2020 | Sawhney | G06T 7/75 |
| 2021/0012239 A1 | 1/2021 | Arzani et al. | |
| 2021/0027182 A1 | 1/2021 | Harris et al. | |
| 2021/0224346 A1* | 7/2021 | Peng | G06F 16/338 |
| 2022/0121955 A1 | 4/2022 | Chavoshi et al. | |
| 2022/0230089 A1 | 7/2022 | Peraud et al. | |
| 2022/0414947 A1* | 12/2022 | Etwaru | G06T 1/60 |
| 2023/0267724 A1* | 8/2023 | Graf | G06T 7/70 |
| | | | 382/156 |
| 2024/0192792 A1* | 6/2024 | Hauenstein | G06F 3/0412 |
| 2024/0346566 A1* | 10/2024 | Qin | G06F 40/40 |
| 2024/0406477 A1 | 12/2024 | Dela Rosa et al. | |

OTHER PUBLICATIONS

Hu, Benyi, "PyRetri: A PyTorch-based Library for Unsupervised Image Retrieval by Deep Convolutional Neural Networks", arXiv:2005.02154v2 [cs.IR], (Aug. 5, 2020), 4 pgs.

Hu, Derek Hao, "Towards Continuous Computer Vision Model Improvement with Kubeflow", [Online] Retrieved from the Internet: <URL: https://www.youtube.com/watch?v=9UPnCo-LG04>, (Nov. 22, 2019), 1 pg.

Ko, Byungsoo, "A Benchmark on Tricks for Large-scale Image Retrieval", arXiv:1907.11854v2 [cs.CV], (Apr. 23, 2020), 9 pgs.

Mahajan, Dhruv, "Exploring the Limits of Weakly Supervised Pretraining", arXiv:1805.00932v1 [cs.CV], (May 2, 2018), 23 pgs.

Matsui, Yusuke, "Billion-scale Approximate Nearest Neighbor Search", CVPR 2020 Tutorial, [Online] Retrieved from the Internet: URL: https://www.youtube.com/watch?v=SKrHs03i08Q&list=PLKQB14e0EJUWaTnwgQogJ3nSLzEFNn9d8&t=53s>, (2020), 1 pg.

Radenovic, Filip, "Revisiting Oxford and Paris: Large-Scale Image Retrieval Benchmarking", arXiv:1803.11285v1 [cs.CV], (Mar. 29, 2018), 10 pgs.

Tan, Mingxing, "EfficientNet: Rethinking Model Scaling for Convolutional Neural Networks", arXiv:1905.11946v5 [cs.LG], (Sep. 11, 2020), 11 pgs.

"Algorithm—Image similarity comparison—Stack Overflow", [Online]. Retrieved from the Internet: <https://stackoverflow.com/questions/5730631/image-similarity-comparison>, (Jun. 28, 2017), 5 pgs.

"U.S. Appl. No. 18/326,724, Corrected Notice of Allowability mailed Jul. 8, 2025", 2 pgs.

"U.S. Appl. No. 18/326,724, Notice of Allowance mailed Jun. 24, 2025", 10 pgs.

"Augmented Reality (AR) tutorial for beginners using Unity 2022", XP093200647, [Online]. Retrieved from the Internet: <https://www.youtube.com/watch?v=gpaq5bAjya8>, (Jun. 27, 2022), 2 pgs.

"Can you create a Bitmoji from a picture?—Quora", XP093200757, [Online]. Retrieved from the Internet: <https://www.quora.com/Can-you-create-a-Bitmoji-from-a-picture/answer/Clossen-Gabrial>, (2021), 1 pg.

"International Application Serial No. PCT/US2024/031880, International Search Report mailed Oct. 16, 2024", 3 pgs.

"International Application Serial No. PCT/US2024/031880, Written Opinion mailed Oct. 16, 2024", 13 pgs.

"International Application Serial No. PCT/US2024/034814, International Search Report mailed Sep. 13, 2024", 3 pgs.

"International Application Serial No. PCT/US2024/034814, Written Opinion mailed Sep. 13, 2024", 8 pgs.

Eskenazi, Cecile, "Snapchat's 3D animated Bitmoji avatar in the real-world, via Snapchat's AR camera", XP093200748, [Online]. Retrieved from the Internet: <https://vnm.youtube.com/shorts/uvgQ-JsUZ1c>, (Sep. 23, 2017), 1 pg.

Nace, Trevor, "How To Create Snapchat Bitmoji With Camera", XP093200719, [Online]. Retrieved from the Internet: <:https://www.youtube.com/watch?v=Ldz5wUzHSUk>, (Dec. 5, 2023), 2 pgs.

Web Whizz, "How to Scan Face for Bitmoji on Snapchat 2024", XP093200775, [Online]. Retrieved from the Internet: <URL: https://www.youtube.com/watch7v-HRb3UmrW9l >, (Aug. 26, 2022), 2 pgs.

"Envoy Proxy—Home Page", [Online]. Retrieved from the Internet: <URL: https://web.archive.org/web/20230608070818/https://www.envoyproxy.io/>, (Archived on Aug. 8, 2023), 6 pgs.

"Facebookresearch / faiss", [Online]. Retrieved from the Internet: <URL: https://web.archive.org/web/20230618032649/https://github.com/facebookresearch/faiss>, (Archived on Jun. 18, 2023), 3 pgs.

"Facebookresearch / faiss—Indexing 1G vectors", [Online]. Retrieved from the Internet: <URL: https://web.archive.org/web/20230505234800/https://github.com/facebookresearch/faiss/wiki/Indexing-1G-vectors>, (Archived on May 5, 2023), 5 pgs.

"Facebookresearch / WSL-Images", [Online]. Retrieved from the Internet: <URL: https://web.archive.org/web/20230227202725/https://github.com/facebookresearch/WSL-Images>, (Archived on Feb. 27, 2023), 3 pgs.

"Kubeflow / pipelines", [Online]. Retrieved from the Internet: <URL: https://web.archive.org/web/20230603143850/https://github.com/kubeflow/pipelines>, (Archived on Jun. 3, 2023), 3 pgs.

"Nearest neighbor search", Wikipedia, [Online]. Retrieved from the Internet: <URL: https://web.archive.org/web/20230604024104/https://en.wikipedia.org/wiki/Nearest_neighbor_search>, (Archived on Jun. 4, 2023), 9 pgs.

"Principal component analysis", Wikipedia, [Online]. Retrieved from the Internet: <URL: https://web.archive.org/web/20230619154954/https://en.wikipedia.org/wiki/Principal_component_analysis>, (Archived on Jun. 19, 2023), 36 pgs.

"Tencent / tencent-ml-images", [Online]. Retrieved from the Internet: <URL: https://web.archive.org/web/20230602120609/https://github.com/Tencent/tencent-ml-images>, (Archived on Jun. 2, 2023), 11 pgs.

"Tensorflow / tpu", [Online]. Retrieved from the Internet: <URL: https://web.archive.org/web/20230315160821/https://github.com/tensorflow/tpu/tree/master/models/official/efficientnet#2-using-pretrained-efficientnet-checkpoints>, (Archived on Mar. 15, 2023), 6 pgs.

"International Application Serial No. PCT/US2024/031880, International Preliminary Report on Patentability mailed Dec. 11, 2025", 15 pgs.

* cited by examiner

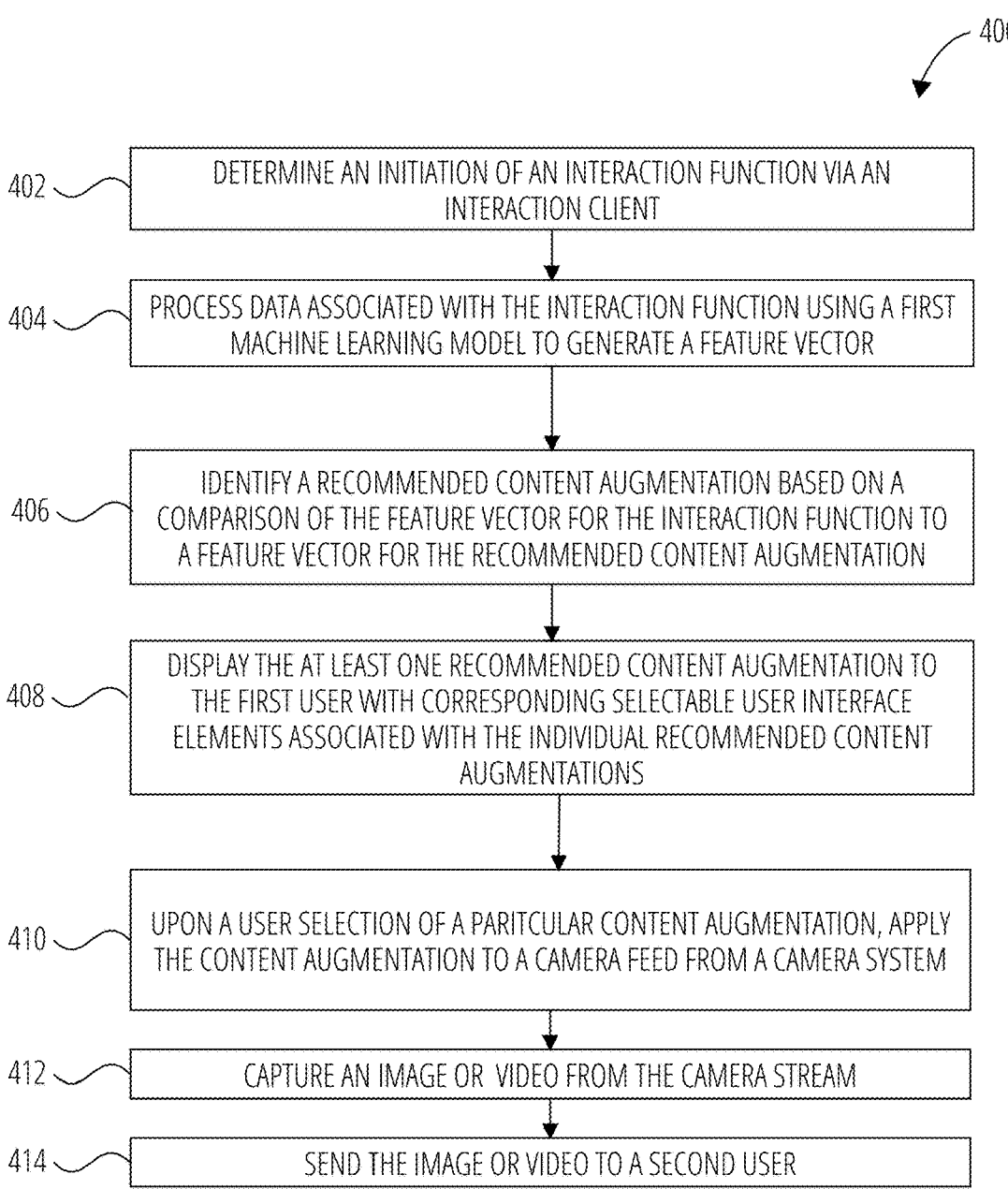

402 — DETERMINE AN INITIATION OF AN INTERACTION FUNCTION VIA AN INTERACTION CLIENT

404 — PROCESS DATA ASSOCIATED WITH THE INTERACTION FUNCTION USING A FIRST MACHINE LEARNING MODEL TO GENERATE A FEATURE VECTOR

406 — IDENTIFY A RECOMMENDED CONTENT AUGMENTATION BASED ON A COMPARISON OF THE FEATURE VECTOR FOR THE INTERACTION FUNCTION TO A FEATURE VECTOR FOR THE RECOMMENDED CONTENT AUGMENTATION

408 — DISPLAY THE AT LEAST ONE RECOMMENDED CONTENT AUGMENTATION TO THE FIRST USER WITH CORRESPONDING SELECTABLE USER INTERFACE ELEMENTS ASSOCIATED WITH THE INDIVIDUAL RECOMMENDED CONTENT AUGMENTATIONS

410 — UPON A USER SELECTION OF A PARITCULAR CONTENT AUGMENTATION, APPLY THE CONTENT AUGMENTATION TO A CAMERA FEED FROM A CAMERA SYSTEM

412 — CAPTURE AN IMAGE OR VIDEO FROM THE CAMERA STREAM

414 — SEND THE IMAGE OR VIDEO TO A SECOND USER

FIG. 4

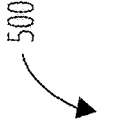
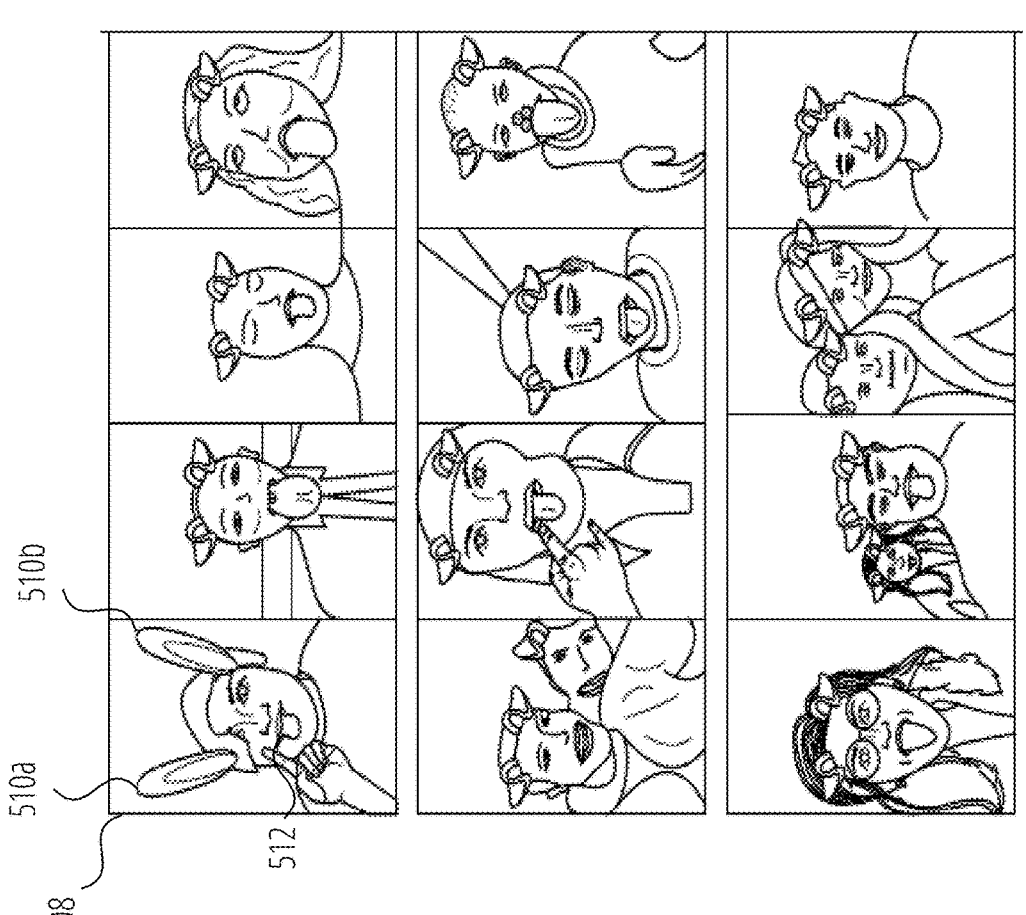
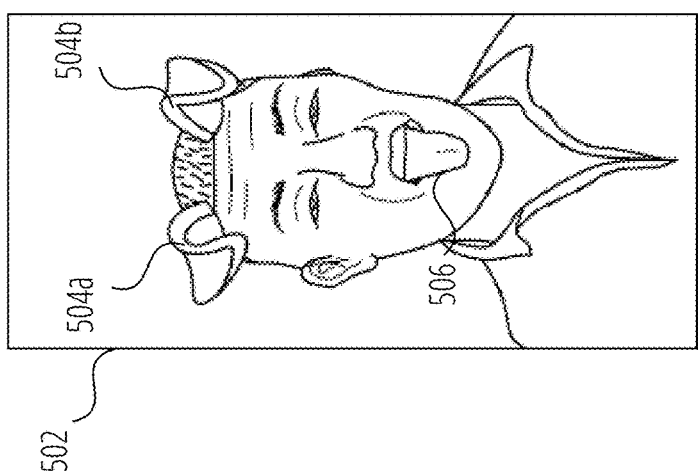
FIG. 5

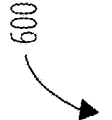
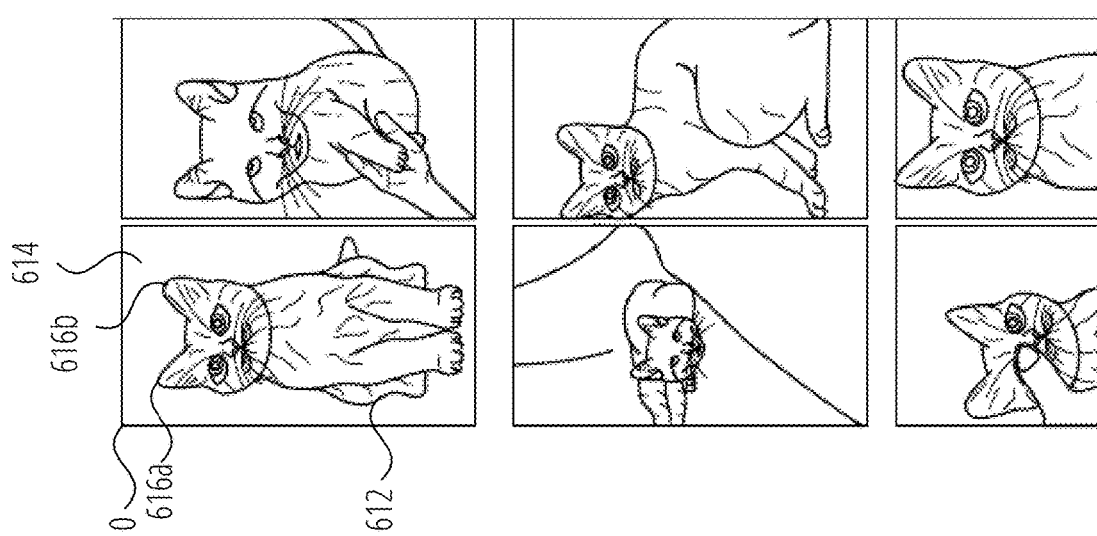
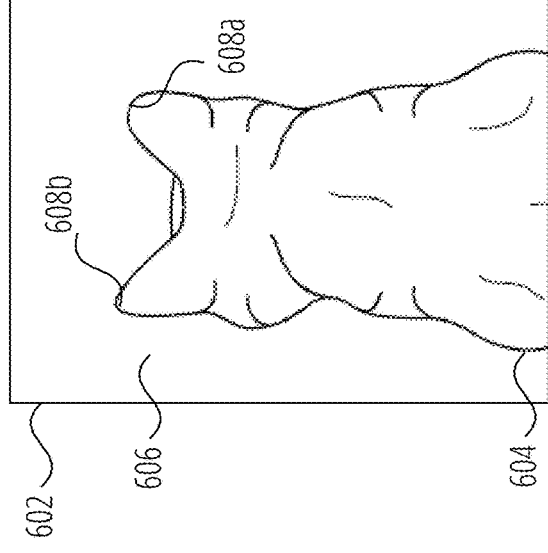
FIG. 6

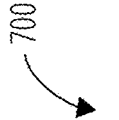
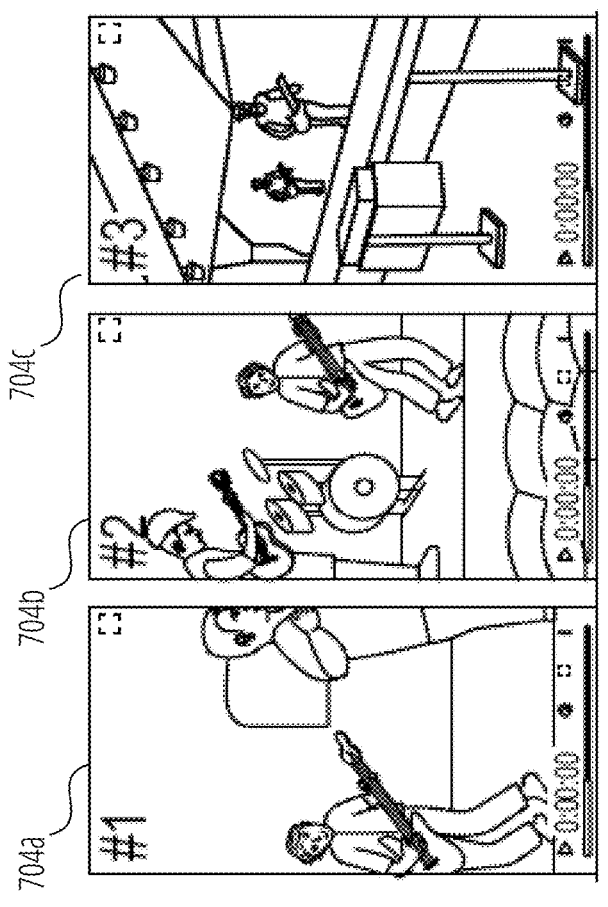
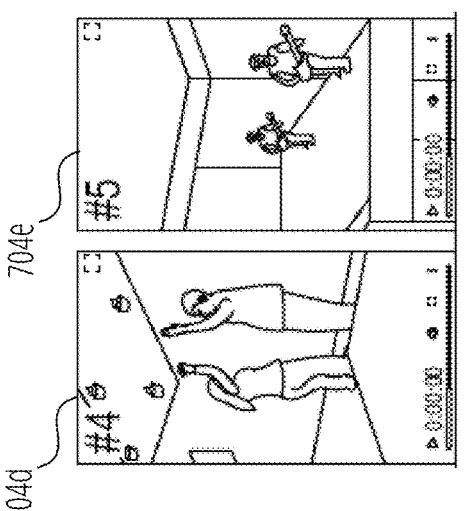
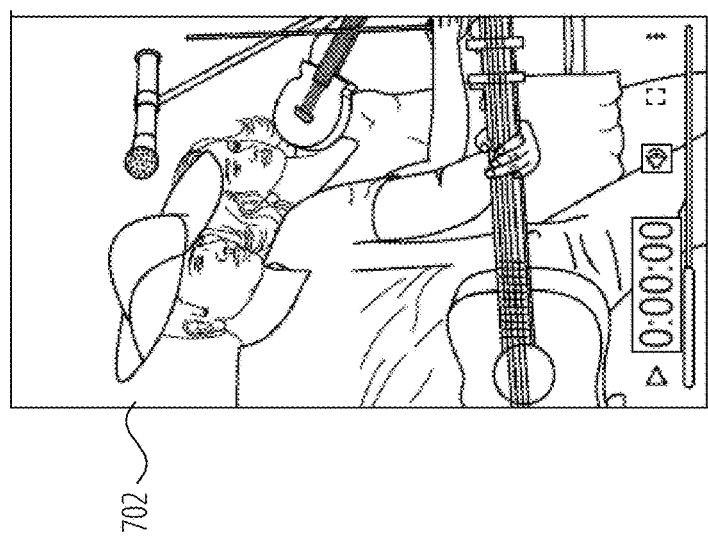
FIG. 7

FIG. 15

SIMILAR CONTENT AUGMENTATIONS SYSTEM

TECHNICAL FIELD

The present disclosure relates generally to content augmentations, and more specifically to identify similar content augmentations.

BACKGROUND

As the popularity of Artificial Intelligence (AI) grows, companies use machine learning models in various ways, which is transforming how we process, analyze, and interact with visual data. The use of AI in image processing involves training algorithms, particularly deep learning models like Convolutional Neural Networks (CNNs), to perform tasks that range from low-level image manipulation to high-level understanding and generation of visual content. Some prominent applications of AI in images include image classification, object detection, image segmentation, facial recognition, and style transfer.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 4 illustrates an example method for providing similar content augmentations, according to some examples.

FIG. 5 illustrates identifying similar content augmentations based on an input content augmentation, according to some examples.

FIG. 6 illustrates similar images or videos based on an input image of a cat, according to some examples.

FIG. 7 illustrates audio and video matching of similar videos, according to some examples.

FIG. 15 is a block diagram showing a software architecture within which examples may be implemented.

DETAILED DESCRIPTION

Figure 1:
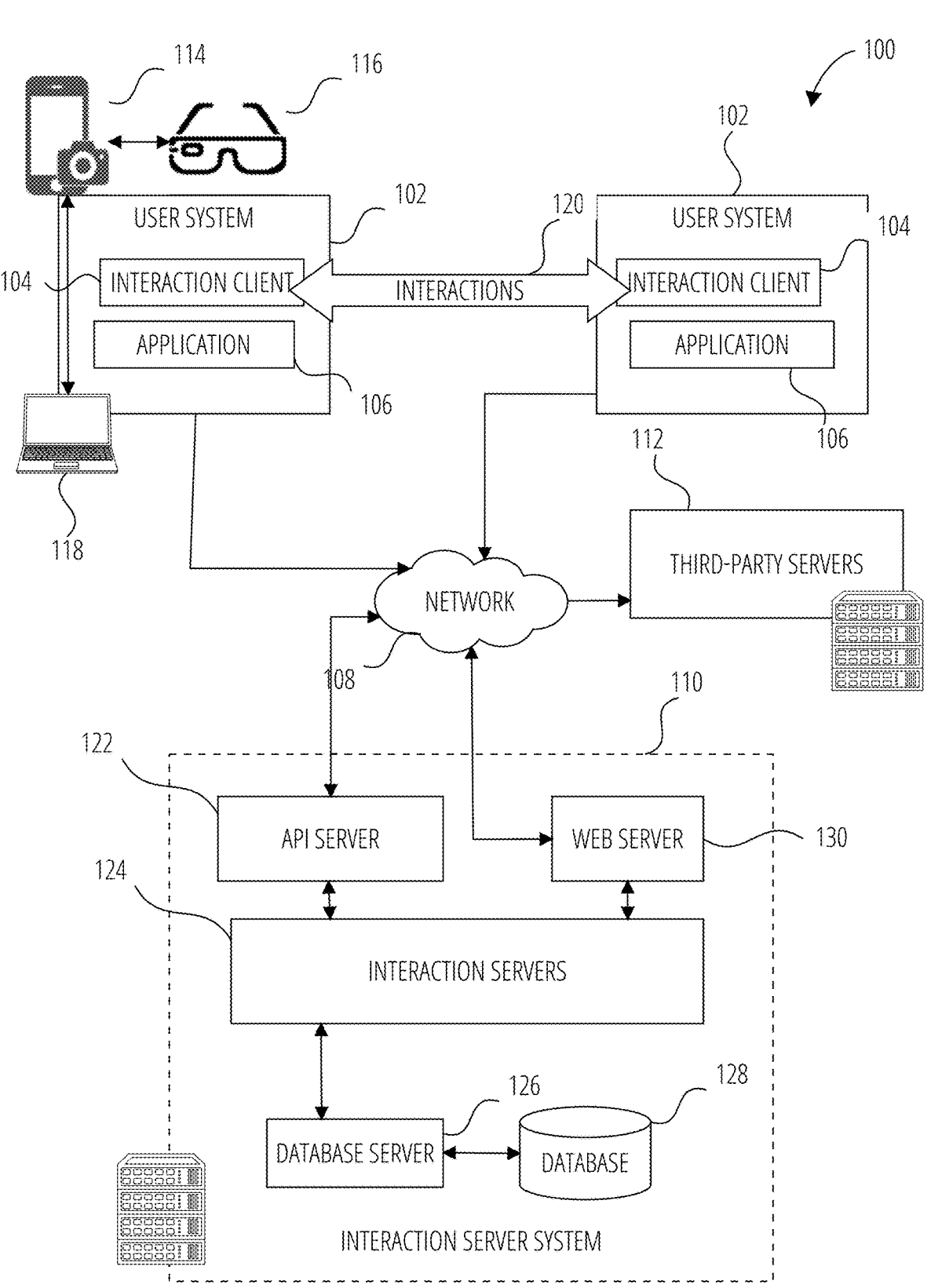
FIG. 1 is a diagrammatic representation of a networked environment in which the present disclosure may be deployed, according to some examples.

Traditional systems for recommending content augmentations typically rely on rule-based algorithms or basic collaborative filtering techniques. These systems apply predefined rules or simple formulas to recommend content augmentations, which may not effectively capture the complexities of user preferences or the diverse range of content augmentations. Moreover, rule-based algorithms and basic filtering techniques struggle to scale as the number of users and content augmentations grow, leading to performance and efficiency challenges.

Another challenge is recommending relevant content augmentations for new users with limited historical interaction data. Traditional systems often rely on demographic information given the lack of interaction data for a new user, and thus cannot find the most relevant recommendations in a database of hundreds of millions of content augmentations. For example, traditional systems identify a location or age of the user to narrow content augmentations that are popular among users with similar demographic attributes.

Example interaction systems improve on these pitfalls by leveraging advanced machine learning models, such as deep learning and neural networks, to provide a more flexible, accurate, and personalized content augmentation recommendation experience.

The interaction systems apply machine learning models and distance-based algorithms, such as Euclidean distances and nearest neighbor algorithms, to find similar content augmentations based on a query and/or other user-inputted content augmentation. The interaction systems generate a set of features from the content augmentations, which can be visual, semantic, or metadata-based. For instance, the interaction systems use deep learning models like convolutional neural networks (CNNs) to extract visual features from the content augmentations, whereas text-based features is extracted from their descriptions or tags.

The interaction systems assess videos with content augmentations to identify real world objects and/or digital content applied to the objects or surroundings. Then, content identified are used to find other similar content augmentations. In some cases, the interaction system identifies environmental and/or circumstantial factors of the current state of users to find the most appropriate content augmentations.

After extracting the features, the interaction systems represent each content augmentation as a high-dimensional feature vector in the feature space, which is used for comparison purposes. The interaction systems select an appropriate distance metric to measure the similarity between content augmentations in the feature space, depending on the nature of the feature space and the desired properties of the distance metric. In some cases, the interaction systems apply a Euclidean distance.

In some examples, the interaction systems identify similar content even though the input content is in a different format, such as finding content augmentations based on an input image or text query. The interaction systems assess text in the query to generate a feature vector. Then, the interaction systems also apply content augmentations to pre-trained machine learning models to generate content augmentation feature vectors, enabling the interaction systems to compare the feature vectors of queries and content augmentations.

The interaction systems calculate the distance between the user input (such as a query or content augmentation) and all other content augmentations in the feature space. Using a nearest neighbor algorithm, like k-Nearest Neighbors (k-NN) or approximate nearest neighbors (ANN), the interaction systems identify content augmentations with the smallest distances to the user input.

As such, the interaction systems apply advanced machine learning models that learns from a vast amount of data, allowing the models to capture the complexities of user preferences and the diverse range of content augmentations. Moreover, the interaction system applies deep learning models and optimization techniques to efficiently handle large-scale data and deliver recommendations in real-time, even as the number of users and content augmentations grow.

Furthermore, these interaction systems leverages content-based features or transfer learning to recommend relevant content augmentations for new users or augmentations with limited historical interaction data. Even for existing users, the interaction systems analyze user behavior, preferences, and content characteristics in greater depth, providing highly personalized content augmentation recommendations that cater to individual tastes and needs.

In summary, systems and methods described herein offer significant improvements over traditional systems for recommending content augmentations by providing users with more adaptable, accurate, and personalized experiences while maintaining real-time performance and scalability.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in the content augmentation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
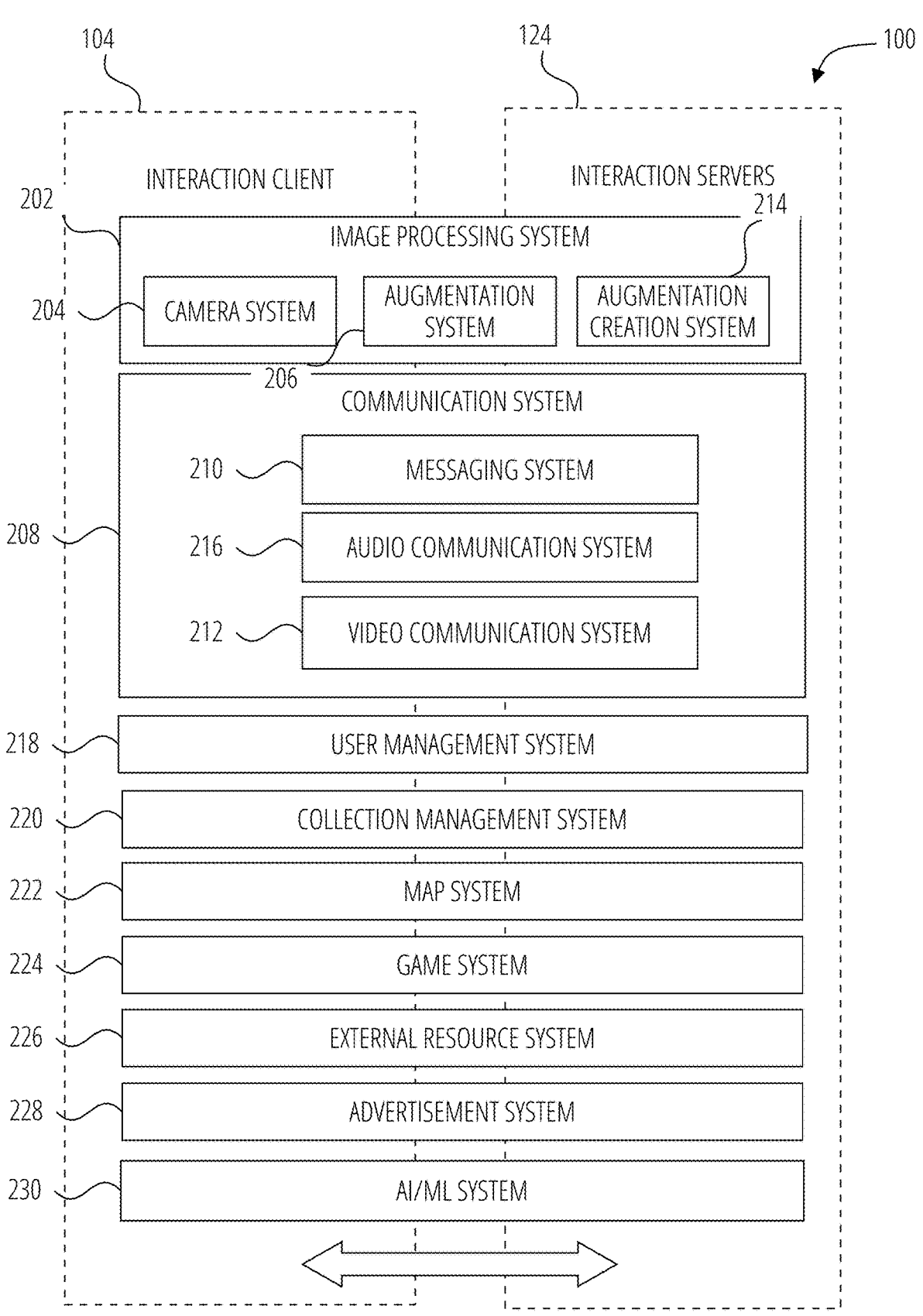
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1302 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
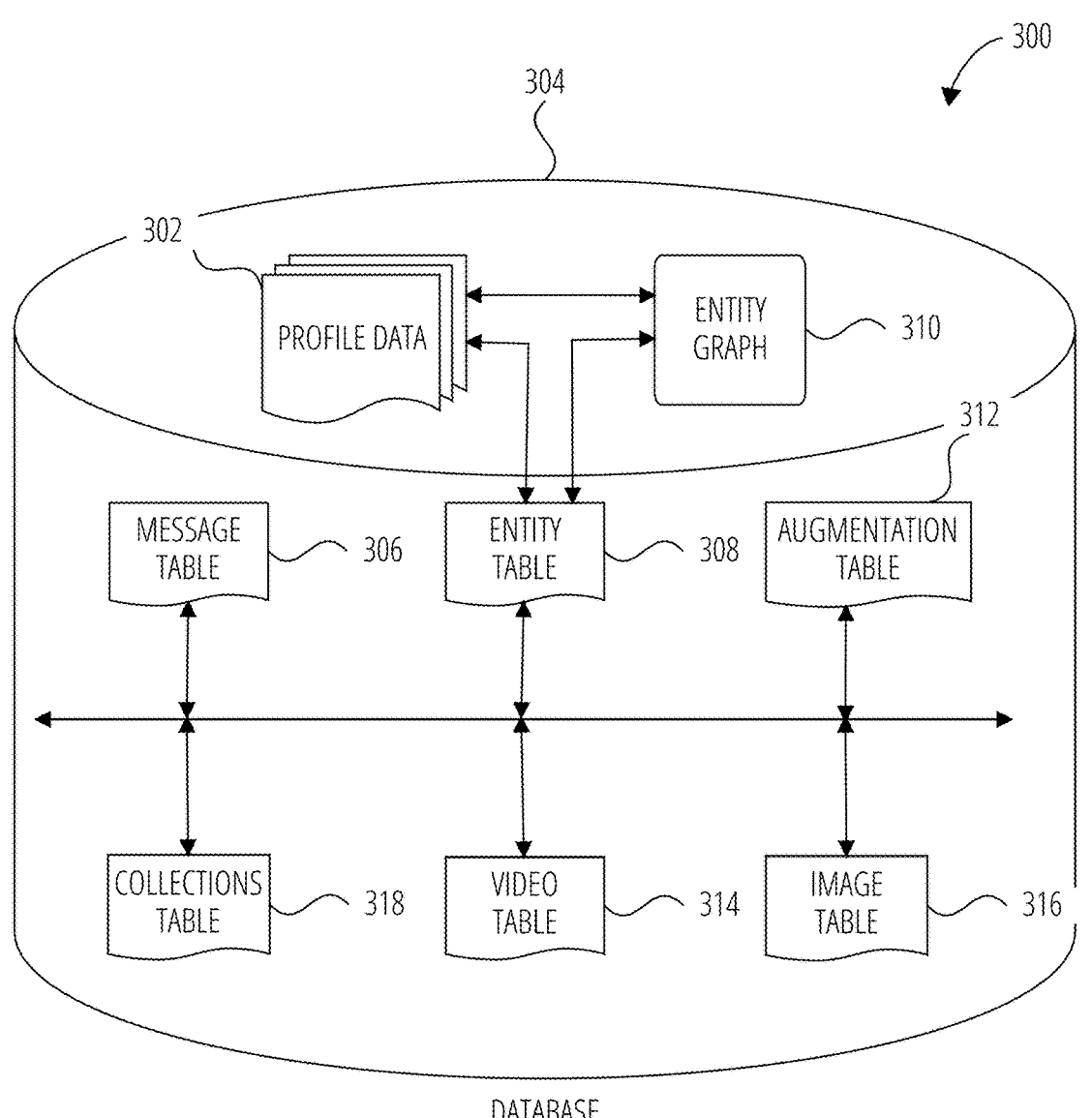
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

Similar Content Augmentations System

FIG. 4 illustrates an example method 400 for providing similar content augmentations, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

FIG. 4 is described as being performed by certain systems or applying certain processes, such as a particular machine learning model or computer vision model, but the processes described herein can be performed by one or more other or the same machine learning models, computer vision models, or a combination thereof.

Extended Reality (XR) is an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

At operation 402, the interaction system 100, via a user system 102 or an interaction server system 110, determines an initiation of an interaction function via an interaction client 104. For example, a user system 102 and/or an interaction server system 110 receives an indication of an interaction function comprising a user input, creation, or selection, via the user system 102, of a content augmentation, an image, a video, an audio clip, a post, content shared with other users, a series of posts or other media content items, curated content from external sources such as news or article websites, and/or the like.

In some examples, the interaction client 104 captures gesture and hand tracking data, such as data related to hand movements and gestures. In some examples, the interaction client 104 captures facial expressions. In some examples, the interaction client 104 captures biometric data, such as heart rate, body temperature, or skin conductivity. In some examples, the interaction client 104 captures data related to user interactions within the virtual or augmented environment, such as objects or buttons users interact with, the time spent in specific areas, or the choices users make.

In some examples, the interaction client 104 captures voice data, voice recognition, voice commands, and/or the like. In some examples, the interaction system 100 captures location data, such as a user's GPS location. In some examples, the interaction system 100 captures usage data related to how and when the devices are used, session duration, frequency of use, and user engagement with specific content or applications.

In some cases, the interaction system 100 identifies a prompt of a user to find relevant content augmentations. Identifying the prompt for the first user includes receiving a question or request from the first user via text or speech. The interaction system 100 identifies keywords from the prompt and applies weights to each of the identified keywords. The interaction system 100 applies the identified keywords and corresponding weights to the machine learning model (such as the first machine learning model described further herein).

In some examples, the interaction system 100 generates a prompt to find relevant content augmentations to display, via the user system 102, automatically based on an intent identified from real-time interaction data captured by the interaction client 104 of the user system 102. In one example, the interaction system 100 generates the prompt based on a user's past activity, interests, and behavior patterns. The interaction system 100 generates personalized prompts for relevant content augmentations related to topics the user may find appealing, such as if a user frequently interacts with a certain type of content about technology.

In some examples, the interaction system 100 uses popular or trending topics from the interaction system 100 or the wider internet to create prompts that are likely to be of interest to a broad audience. In some examples, by utilizing a user's geographic location, the interaction system 100 generates prompts that are relevant to their local area, such as events, news, or cultural topics.

In some examples, the interaction system 100 creates prompts based on the time of day, season, or upcoming events or holidays, such as events that are time sensitive. In some examples, the interaction system 100 uses the user's social connections to generate prompts related to their friends, family, or other users they follow, such as a birthday or new connection with another user. In some examples, based on the user's activity within a specific application or AR experience, the interaction system 100 generates prompts related to that context.

In some examples, the interaction system 100 uses the user's in-application actions, such as likes, comments, and shares, to generate prompts related to their interests. For example, if a user frequently interacts with content about cooking in a recipe application, the interaction system 100 generates a prompt for the user's favorite dish to prepare at home. In some examples, by utilizing sensors and data from the user's mobile device or AR headset, the interaction system 100 creates context-aware prompts based on their physical environment. In some examples, the interaction system 100 generates prompts based on real-time events occurring within the application or AR experience, such as a live-streamed event. In some examples, the real-time interaction data includes a current camera feed from a camera system of the first interaction client 104.

In some examples, the interaction system 100 uses the user's past activity, preferences, and behavior patterns within the application or AR experience to generate a prompt for the user. In some examples, the interaction system 100 gathers user profile information, such as a calendar of appointments or objects detected in a camera feed of an AR device to generate a prompt. In some examples, by incorporating gamification elements, the interaction system 100 creates prompts that encourage user participation and engagement, such as checking on a feature within a game. The interaction system 100 identifies media content items (such as content augmentations) based on prompts, user inputted media content items, and/or the like.

At operation 404, the interaction system 100, such as the interaction client 104, processes data associated with the interaction function using a first machine learning model to generate a feature vector. The feature vector comprises a set of features for the interaction function. The interaction system 100 extracts meaningful features from media content items associated with the interaction function. In some cases, for images, videos, or content augmentations, the interaction system 100 uses convolutional neural networks (CNNs) or other deep learning models trained on image recognition tasks. The interaction system 100 trains these models to extract features from images, such as edges, shapes, textures, and colors.

Feature extraction is the process of identifying and extracting relevant information from raw data, in this case, the media content items associated with interaction functions. The interaction system 100 transforms the media content items into a more compact and informative representation, which is later used for tasks such as similarity matching or classification.

In some cases, the interaction system 100 applies CNNs, which are a class of deep learning models that are designed specifically for image recognition tasks. The CNNs include multiple layers, such as convolutional layers, pooling layers, and fully connected layers, which together help extract hierarchical features from the input images.

Convolutional layers are the primary building blocks of CNNs, which include a set of filters (also called kernels) that slide across the input image and perform element-wise multiplication followed by a summation. Each filter in a convolutional layer is designed to detect a specific feature, such as edges, corners, or textures, depending on the layer depth. The early layers in the CNN typically capture low-level features like edges and textures, while deeper layers capture more complex, high-level features, like object parts or even entire objects.

The interaction system 100 also employs pooling layers to reduce the spatial dimensions of the feature maps, fully connected layers where the feature maps are flattened and connected to one or more fully connected layers, and/or the like.

By using a CNN-based feature extraction approach, the interaction system 100 captures meaningful and representative features from the media content items. These features are then used as input for Euclidean distance or nearest neighbor algorithms to identify similar media content items, such as content augmentations.

Once the features are extracted, the interaction system 100 changes the features in a suitable format that are used for comparison. In some examples, the interaction system 100 generates feature vectors, which are numerical representations of the extracted features. The length of the feature vector depends on the output layer of the neural network used for feature extraction.

In some cases, since the extracted feature vectors may have high dimensionality, the interaction system 100 performs dimensionality reduction to make computation more efficient and remove any noise or redundancy and normalizes the vectors to ensure that the features have the same scale and are not biased towards specific components.

In some cases, the interaction system 100 trains the first machine learning model to generate features vectors from content augmentations. The interaction system 100 gathers datasets including example content augmentations. This dataset includes images, videos, or audio files with different types of augmentations applied, such as facial filters, object tracking, AR experiences, and video filters. The interaction system 100 creates a dataset by manually applying different augmentations to a diverse set of images or videos or by sourcing user-generated content. The dataset includes images with and/or without content augmentations.

In some cases, the interaction system 100 collects new training content. The interaction system 100 collects user data as individuals interact with various features within the platform. As users create posts, upload images, videos, or write comments, this content is collected and analyzed by the platform to continuously train machine learning models. This data helps the platform understand users' interests, preferences, and social connections, allowing the platform to generate and update machine learning models to deliver relevant content and recommendations.

In some cases, the interaction system identifies similar training content to apply to the training of the machine learning model. In some examples, the interaction system 100 identifies similar images or content augmentations from an original image or content augmentation using computer vision techniques. The interaction system 100 extracts features from images or the content augmentations, compares the features to features identified in other images or content augmentations, and determines similarity based on a chosen metric. For example, the original training data could be new user data, such as media content items created in 2023, and the other similar images that are identified could be for the entire database of media content items, including media content items created in 2019 and 2022.

In some cases, the additional media content items (such as content augmentation) for training the machine learning models are identified based on metadata of the accessed media content item. The interaction system 100 identifies additional media content items based on metadata of the original media content item, such as a unique identifier of the user who posted the media content item, a date and time when the media content item was created and posted, or the geolocation data (latitude and longitude) of the user when the media content item was created.

In some cases, the interaction system 100 identifies similar additional media content based on information about any filters, lenses, or stickers applied to the media content item, text or captions added to the media content item, a number of times the media content item has been viewed by other users, a number of times the media content item has been screenshotted by other users, and/or the like.

In some cases, the interaction system 100 identifies similar additional media content based on the time when the media content item will expire and be automatically deleted (such as 24 hours after posting), metrics related to user interaction with the media content item (such as replies, mentions, and shares), information about the device used to create the media content item (such as the device model, operating system, and app version), an IP address of the device used to post or create the media content item which are used to determine the user's approximate location, and/or the like.

In some cases, the interaction system 100 returns the most similar images or content augmentations to the original image or content augmentations by selecting the top k images or content augmentations with the smallest Euclidean distances. The value of k depends on the desired number of similar images or content augmentations to be retrieved for training the models. By using the nearest neighbor algorithm and Euclidean distance, the interaction system 100 effectively identifies similar images or content augmentations from an original image or content augmentation.

In some cases, the interaction system 100 labels the training content. Automatically labeling training data is crucial when dealing with large volumes of data, such as posts, videos, images, or content augmentations from users on the interaction system 100. The interaction system 100 applies a variety of techniques to generate labels for training machine learning models.

In some cases, the interaction system 100 applies a set of rules or heuristics based on domain knowledge to automatically assign labels to the data. For example, if a post or content augmentations contains specific keywords or phrases, the post is labeled as belonging to a certain category. In some cases, the interaction system 100 uses a predefined list of keywords or phrases, and labels are assigned to the data based on the presence or frequency of these keywords in the content.

In some cases, the interaction system 100 applies weak supervision by leveraging noisy or less accurate labels from multiple sources to create a more accurate label. These sources include rule-based systems, crowd-sourced annotations, or other existing models. In some cases, the interaction system 100 applies semi-supervised learning by using a small set of labeled data along with a larger set of unlabeled data to train a model. The model is first trained on the labeled data and then used to predict labels for the unlabeled data. These predicted labels are used to retrain the model iteratively, improving the model's performance and generating better labels for the data.

The interaction system 100 cleans, preprocesses, and/or labels the content augmentations. The interaction system 100 resizes, crops, or normalizes the content augmentations to ensure consistency. Additionally, the interaction system 100 annotates each content augmentation in the dataset with relevant labels or metadata, such as the type of augmentation, creator information, category or theme, and/or technical specifications.

The interaction system 100 adds the new training data with the labeling to the existing training dataset such that the training dataset is continuously growing with new user content. Then, the interaction system 100 trains and evaluates the machine learning model. The interaction system 100 trains the machine learning model by adjusting model parameters to minimize a specific loss function or maximize a certain objective. The loss function is determined based on the media content item output from the machine learning model with an expected media content item stored within the training data.

In some cases, the labels are embedded with the training data. The interaction system 100 concatenates the label information with the text feature vector. As such, the model is trained to classify similarities in content augmentations considering both content and label information.

The interaction system 100 extracts meaningful features from the dataset that represents the characteristics of different content augmentations. The interaction system 100 applies convolutional neural networks (CNNs) for images, videos, or content augmentations, or audio processing algorithms for audio files. The interaction system 100 trains the model on the preprocessed and annotated dataset, using an appropriate loss function and optimization algorithm. The model learns to generate feature vectors that effectively capture the characteristics of different content augmentations. The interaction system 100 splits the dataset into training and validation sets, tunes hyperparameters, and monitors training progress for overfitting or other issues.

The interaction system 100 evaluates the trained model's performance by comparing its generated feature vectors against the ground truth annotations or metadata. The interaction system 100 applies evaluation metrics for this comparison, such as accuracy, precision, recall, F1-score, or cosine similarity. If the model's performance is unsatisfactory, the interaction system 100 adjusts the model's architecture, hyperparameters, or training data. Once the model's performance is satisfactory, the interaction system 100 deploys the model to generate feature vectors for content augmentations in real-world applications, such as content recommendation, categorization, or search.

In some cases, the first machine learning model outputs a feature vector for the content augmentation that includes audio and video data. FIG. 5 illustrates a user interface 500 identifying similar content augmentations based on an input content augmentation, according to some examples. The interaction system 100 receives an input image 502. In some examples, the input is a video with content augmentation applied or the content augmentation filter itself.

The content augmentation 502 applies dog ears 504a, 504b to the head of an individual. The first machine learning model outputs a feature vector that includes image data, such as an indication of two dog ears shown from the image. As such, the feature vector includes a digital element made by the content augmentation.

In some cases, the interaction system 100 identifies features of the content augmentation. Content augmentations modify a camera feed from a camera system in several ways by applying real-time digital effects and overlays. The interaction system 100 trains the machine learning model to detect facial features and applied effects, such as makeup, masks, or animal features, or to detect modified facial expressions, changed skin texture, or changed face shapes. The machine learning model detects features of augmentations to identify and track objects within the camera feed, and overlaying 3D models, animations, or other digital elements onto the objects.

In some cases, the machine learning model identifies features of augmentations to replace or modify the background of a camera feed with a different image, video, or pattern. The machine learning model identifies digital content overlaid onto the real-world, as seen through the camera feed, such as placing virtual furniture in a room or displaying virtual information about nearby points of interest. The machine learning model identifies added animated text, stickers, or other graphic elements to the camera feed, which are used for emphasis, decoration, or communication.

In some cases, the machine learning model finds features of applying various color adjustments and filters to the camera feed, changing the overall look and feel of the video, such as changes to brightness, contrast, saturation, or applying vintage or artistic filters. The machine learning model identifies manipulation of the camera feed's playback speed or creates time-based effects like slow motion, fast forward, or looping.

In some cases, the machine learning model is trained to find augmentations based on the device's location data, such as displaying location-specific overlays or effects in the camera feed, such as geo-filters that showcase nearby landmarks, events, or city-specific elements. The machine learning model identifies features of applying various image distortion or warping effects to the camera feed, such as fisheye lenses, kaleidoscope effects, or perspective warping.

In some cases, the machine learning model is trained to identify features related to modifying the audio captured by the camera system, applying effects like voice changers, pitch adjustments, or adding background music and sound effects.

In some cases, the interaction system 100 identifies characteristics of real-life objects shown in the camera feed. In some examples, at least one of the set of features include a real-world object, wherein the content augmentation augments, modifies, or overlays one or more digital elements on or near the real-world object detected from a camera feed of a camera system. In the example of FIG. 5, the interaction system 100 receives an image or video of a user with content augmentation applied. The real-life user has the user's tongue 506 sticking out. The first machine learning model also adds to the feature vector characteristics of the real-world, such as the tongue sticking out of the user.

At operation 406, the interaction system 100, such as the interaction client 104, identifies at least one recommended content augmentation based on a comparison of the feature vector for a media content item associated with the interaction function to a feature vector for the at least one recommended content augmentation. In some cases, once the interaction system 100 generates normalized feature vectors, the interaction system 100 applies distance metrics, such as a Euclidean distance or cosine similarity, to calculate the similarity between media content items. Euclidean distance measures the straight-line distance between two points in the feature space, while cosine similarity measures the angle between the feature vectors.

The interaction system 100 uses a distance metric, such as Euclidean distance, to measure the similarity between data points in a multidimensional space. The interaction system 100 applies the distance metric in nearest neighbor approaches, such as the k-Nearest Neighbors (k-NN) algorithm, to identify similar content augmentations. As noted above, the interaction system 100 generates feature vectors in a high-dimensional space based on a machine learning algorithm. Each dimension corresponds to a specific feature, and the value represents the magnitude of that feature.

The interaction system 100 calculates a Euclidean distance, which is a distance metric that measures the straight-line distance between two points in a multidimensional space. Given two points P $(x1, y1)$ and Q $(x2, y2)$, the Euclidean distance between them are calculated as: $d(P, Q) = sqrt((x2-x1)^2 + (y2-y1)^2)$. This formula is extended to higher dimensions by summing up the squared differences for each corresponding feature in the feature vectors.

Then when a new data point (query point) is introduced, the interaction system 100 calculates the Euclidean distance between the query point and every other point in the dataset.

The k points with the smallest distances are identified as the nearest neighbors. Thus, using Euclidean distance in nearest neighbor approaches helps the interaction system 100 in identifying the most similar content augmentations based on their feature representation. By considering the k nearest neighbors, the interaction system 100 makes more accurate and robust predictions or decisions, as it takes into account the local structure of the data.

In the example of FIG. 5, the interaction system identifies recommended content augmentations, such as recommended content augmentation 508. The recommended content augmentation 508 is similar to the input content augmentation 502 where the recommended content augmentation 508 includes characteristics of the real-world object (the person shown in content augmentation 502 with the tongue 506) by finding a recommended content augmentation 508 with the user also showing her tongue 512. Moreover, the interaction system 100 provides a recommended content augmentation 508 where the content augmentation applies bunny ears 510a, 510b, similar to the original input content augmentation that applies dog ears 504a, 504b.

At operation 408, the interaction system, such as the interaction client 104, displays the at least one recommended content augmentation to the first user. The interaction system 100 displays the recommended content augmentations with corresponding selectable user interface elements associated with the individual recommended content augmentations.

The interaction system displays the content augmentations where each recommended content augmentation is placed in individual cells. The interaction system displays the first selectable user interface element (e.g., a selectable icon representing the recommended content augmentations) within the user interface cell for the recommended content augmentation. In the example of FIG. 5, the recommended content augmentation 508 is placed into a rectangular tile (e.g., a cell), whereby a user selects the tile to initiate a certain action, such as saving or sharing the video or recommended content augmentation, and/or open a camera system that applies the recommended content augmentation.

Advantageously, the interaction system, according to some examples, provides a practical solution to a technical problem of limited user interface real estate, complex navigation in a user interface, or both. The interaction system automatically identifies relevant context augmentations using an input content augmentation and displays options to access such recommended context augmentations on the same screen that also displays the input content augmentation.

At operation 410, upon a user selection of a particular content augmentation, such as recommended content augmentation 508, via a selectable user interface element, the interaction client 104 initiates opening of a camera system of an interaction client 104 for the user. In some cases, the recommended content augmentation is automatically applied to the camera feed. The selectable user interface element is a button, a portion of the cell, or the entire cell where the recommended content augmentation is being displayed.

At operation 412, the user captures an image or video from the camera stream with the recommended content augmentation applied, and at operation 414, the user sends the image or video to a second user. The user selectable interface element enables a user to directly access a camera feed with a context augmentation applied, and enables the user to record and send a picture or video directly to the friend.

Moreover, given the limited user interface real estate with at least some current technology, the interaction system displays an icon within the same cell of the recommended content augmentation or embedded within the same cell. Thus, the technical problem of navigating through numerous graphical user interfaces to send an augmented picture or video may be solved by the practical solution of automatically identifying similar media content items that is applied to a camera feed with one simple click of a button.

In some examples, the interaction system determines a number of recommended context augmentations to display based on a characteristic of the interaction client that the user is using. The interaction system limits a number of recommendation context augmentations to display based on screen size. In some examples, the interaction system varies the number based on whether the interaction client is a mobile device or a laptop screen, or a screen size for different mobile devices.

Moreover, because one or more of the processes described herein is performed on the interaction system 100, remote from the interaction client 104, the processors analyze large amounts of data, run complex algorithms/processes (such as collecting massive amounts of new user-created data to recommend as similar media content items to users through computationally heavy processes such as training machine learning models and applying machine learning models to very large databases), and have access to databases that may not be available to the interaction client 104. Accordingly, this practical application is a technological improvement, as the processing is performed without being dependent on the hardware, operating system, and/or software of the interaction client 104. Moreover, such processing on the server side results in faster processing with more processing power of servers, rather than being limited to the processing power of an interaction client 104 (such as a mobile phone, laptop, or AR device). Furthermore, remote processing improves on data privacy and network communication security, as sensitive data do not have to be passed to and from the interaction client 104 over the Internet.

Systems and methods described herein include training a machine learning network, such as training of a machine learning model to generate feature vectors from different types of media content items. The machine learning network is trained to perform specific functions, such as identifying digital items from content augmentations as well as identifying characteristics in the real-world environment, and/or the like. The machine learning algorithm is trained using historical information that include historical content augmentation data.

Training of models, such as artificial intelligence models, is necessarily rooted in computer technology, and improves modeling technology by using training data to train such models and thereafter applying the models to new inputs to make inferences on the new inputs. Here, the new input is a content augmentation that the user selects to be applied to a camera feed.

Such training involves complex processing that typically requires a lot of processor computing and extended periods of time with large training data sets, which are typically performed by massive server systems. Training of models requires logistic regression and/or forward/backward propagating of training data that includes input data and expected output values that are used to adjust parameters of the models. Such training is the framework of machine learning algorithms that enable the models to be applied to new and unseen data (such as new content augmentations data) and make predictions that the model was trained for based on the weights or scores that were adjusted during training. Such training of the machine learning models described herein reduces false positives and increases the performance of outputting correct and relevant data that the machine learning model is trained for.

In some examples, interaction functions include user interaction with a camera feed displayed on the user system 102, such as selecting a real-world object on a camera feed or selecting a digital item or overlay shown on the camera feed. In some examples, interaction functions also include a chat window where messages, stickers, emojis, and other media content items are shared between users via user systems 102.

Interaction functions further include sending photos or videos to friends, either individually or in groups, which are edited with text, stickers, filters, and drawings before being sent. Interaction functions include capturing a video or audio, inputting text, or other communications that disappear after certain conditions are met, such as being viewed once or setting a time limit, creating a more ephemeral and casual sharing experience.

In some examples, interaction functions include generating or viewing a collection of videos, messages, stickers, or other media content items that are visible to friends for a certain period of hours (e.g., 24 hours). Interaction functions include displaying media content items from other users, such as publishers, creators, and influencers, where users explore and subscribe to different channels to receive updates on their favorite content. Interaction functions include map and location functions, such as users sharing their location with friends and viewing their friends' locations on a map, or exploring a map with points of interest by other users categorized by location and events.

In some examples, interaction functions include generating or applying various filters and content augmentations to enhance images, videos, or other media content items to share with others, such as by adjusting the color or appearance or adding interactive elements such as animations and facial transformations, in real-time. Interaction functions include saving favorite media content items with other users in a private archive, where users access these saved media content items later, edit them, or share them with friends.

Interaction functions include personalizing or applying avatars which are used as a profile picture to be viewed by others and in stickers, chat, and image/video decorations. Interaction functions include playing multiplayer games that users play with their friends directly within the user interface of the system to share messages and media content items.

Interaction functions include capturing data by an Augmented Reality (AR) device. In some examples, the interaction system 100 captures motion and position data, such as data from accelerometers, gyroscopes, and magnetometers to track user movement or orientation. In some examples, the interaction system 100 captures eye-tracking data which monitors the user's eye movements and focus, gaze-based interactions, objects the user is focused (or not focused) on, or user attention patterns.

Identifying Similar Images, Videos, or Audio Based on User Input

FIG. 6 illustrates a user interface 600 displaying similar images or videos based on an input image of a cat, according to some examples. In this example, the user system 102 receives input of an image 602 including a cat 604 and background 606 of a room viewed from indoors. The cat 604 is sitting in an upright position and has pointy ears 608a, 608b.

The interaction system applies a machine learning model to identify features within the image 602, such as features of the cat 604 or the room. In some examples, the system identifies an object detected in an image and characteristics of that image.

The machine learning model is trained to identify characteristics of the cat 604. For example, the model is trained to recognize the specific cat breed based on its unique physical features, such as fur patterns, size, and facial structure. The model is further trained to identify the cat's fur color and pattern, such as solid, tabby, or tortoiseshell. The machine learning model estimates the cat's age by analyzing physical features that change over time, such as size, fur condition, and facial features. The machine learning model can also detect and classify the cat's emotional state by analyzing facial expressions, body posture, and ear positioning.

In some cases, the model identifies signs of potential health issues, such as obesity, skin or fur problems, or injuries, by analyzing the cat's physical appearance. The model is also trained to recognize a cat's activity, such as sitting, lying down, running, or playing, based on its posture and position in the image. The model is trained to determine the type of environment the cat is in, such as indoors or outdoors, by analyzing the background and context of the image such as other objects detected in the image. The model also detects the presence of other objects or animals in the image, such as toys, furniture, or other pets.

The interaction system 100 applies the input image 602 of a cat 604 to a machine learning model trained to detect features of the cat 604 shown in the image 602. These features are placed into a feature vector, which is then compared to other images, videos, and/or content augmentations. The interaction system 100 applies a distance metric to identify similar images, videos, and/or content augmentations to the input image 602.

The interaction system 100 displays the similar images, videos, and/or content augmentations on a user interface of the interaction client for the user. For example, one of the similar videos is video 610 of a cat 612 in a similar pose as the cat 604 in image 602, in a similar background 614 as the background 606, and showing ears 616a, 616b like the ears 608a, 608b in the image 602. The video is identified as similar to the image because both the video and image are processed through machine learning models to generate feature vectors, which is then compared. As such, a similar media content item that is of a different type than the input media content item is identified and displayed to the user.

FIG. 7 illustrates audio and video matching 700 to identify similar videos, according to some examples. The interaction system 100 matches videos for similarity based on an input video using feature extraction and nearest neighbor algorithms that involve analyzing and comparing both visual and auditory content of different videos. In the example of FIG. 7, the user submits an input video 702 of a live band playing a particular song with audio data. The interaction system 100 preprocesses the input video and the videos in the dataset by resizing the videos, converting them to grayscale, and normalizing the audio.

The interaction system 100 applies a machine learning algorithm to extract features from the video to identify the visual aspects, such as object shapes, textures, and motion patterns, which represent the content of the video. The interaction system 100 applies the same or a separate machine learning algorithm to extract auditory aspects, such as pitch, timbre, and rhythm, which represent the content of the audio.

The interaction system 100 applies the machine learning algorithm to identify certain aspects of the audio data. The machine learning algorithm identifies a speed or pace at which the music is played, such as in beats per minute (BPM). The machine learning algorithm identifies the pattern of beats and accents in a song, sequence of pitches and notes that form the main theme or tune of a song, harmony created by chords and chord progressions that support the melody, unique sound quality of different instruments and voices, variations in volume or intensity of the music, the tonal center or scale used in a piece of music, style or category of music, the words or text of a song, the arrangement of different sections in a song, the overall feeling or atmosphere conveyed by the music, and/or the like.

In some instances, the interaction system 100 identifies a song that is playing in the video. The machine learning algorithm identifies a song from a video using audio fingerprinting or audio recognition techniques. The machine learning algorithm analyzes the audio signal and extracts distinctive features, such as spectral patterns, tempo, pitch, and timbre. The machine learning algorithm creates a compact representation of the extracted features, and searches a large database of known audio fingerprints for a match. If a match is found, the AI identifies the song.

Once the song is identified, the machine learning algorithm and/or the interaction system 100 accesses additional information about the song, such as the name of the song, the performer or band who recorded the song, the album or collection the song belongs to, the date when the song was first released, the musical style or category of the song, and/or the like.

The machine learning algorithm uses the various features identified in the audio and video data to identify other similar media content items, such as by using a Euclidean distance, cosine similarity, or Manhattan distance.

The interaction system 100 displays other similar videos 704a, 704b, 704c, 704d, 704e, collectively referred to herein as similar videos 704. The similar videos 704 are also playing the same song as input video 702, showing a live band playing music outdoors, and playing the song with similar musical instruments.

Figures 8, 9, 10:
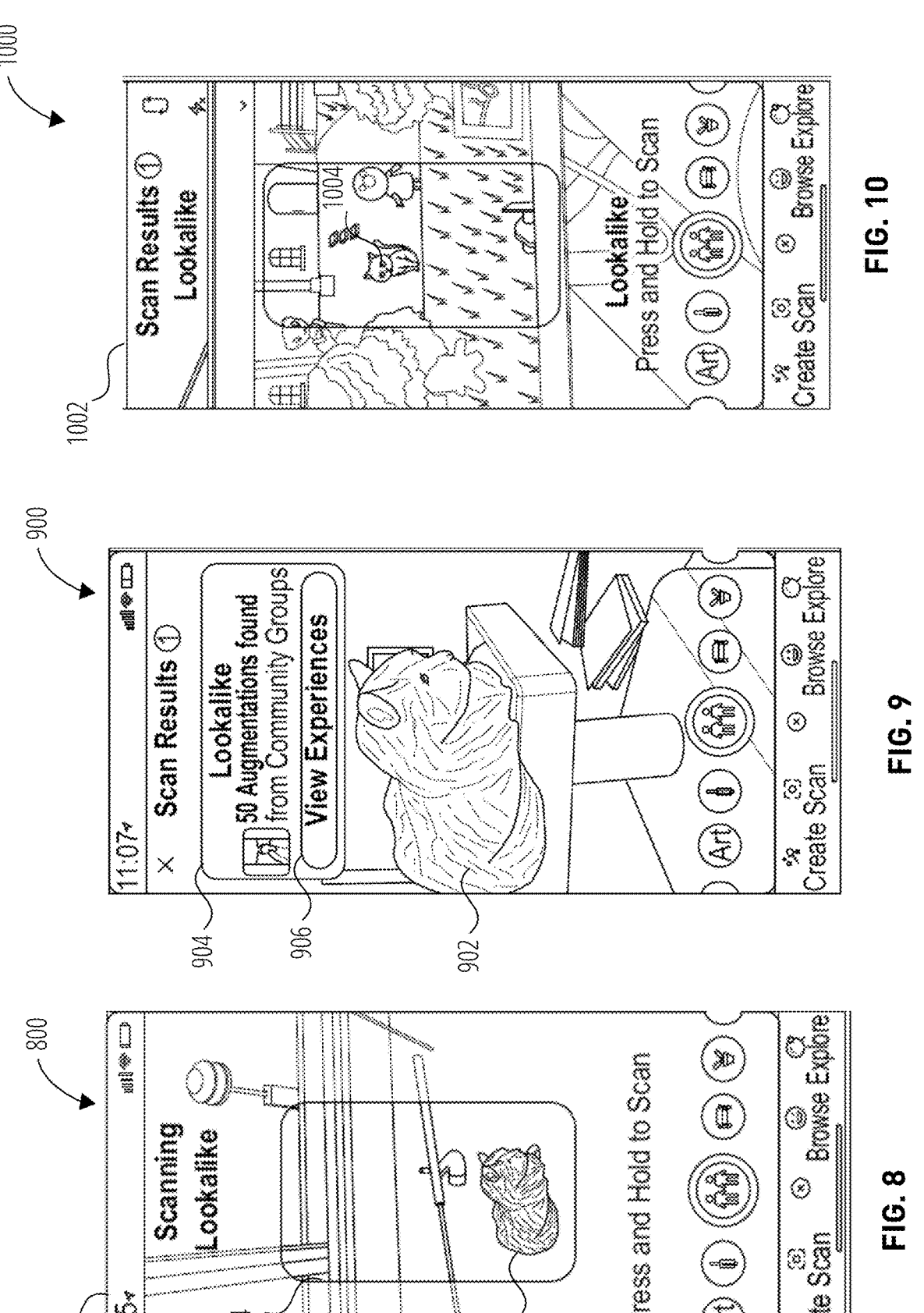
FIG. 8 illustrates a user interface where a user can select an object from a live camera feed, according to some examples.
FIG. 9 illustrates a user interface displaying an option to select content augmentations for the identified object, according to some examples.
FIG. 10 illustrates the application of a content augmentation for the identified object, according to some examples.

FIG. 8 illustrates a user interface 800 where a user selects an object from a live camera feed, according to some examples. The user interface 800 shows a camera feed 802 from a mobile phone displaying an object, such as a cat 806. The user interface 800 provides an area, such as the box 804, suggesting the user to place the object within the box 804. The user presses and holds down on the cat 806 and the interaction system 100 performs object recognition on the cat.

The interaction system 100 processes the image through a machine learning model that generates a feature vector that includes an indication that the object is a cat. The machine learning model further provides other characteristics of the cat (as further described herein) and places the features into the feature vector.

The interaction system 100 uses a similarity process, such as the nearest neighbor algorithm, to identify content augmentations that are relevant to the features extracted from the user interface 800.

FIG. 9 illustrates a user interface 900 displaying an option to select content augmentations identified for the object, according to some examples. The user interface 900 displays a notification 904 of a number of content augmentations available based on the cat 902 identified in the user interface, and a selectable user interface element 906 to initiate the application of a content augmentation.

FIG. 10 illustrates the application of a content augmentation 1000 for the identified object, according to some examples. The content augmentation is applied to a camera feed of a camera system. The user interface 1002 displays a content augmentation of an animated version of a cat 1004 overlaid on a real life camera feed.

Recommending a Content Augmentation Based on an Input Image

Figure 11:
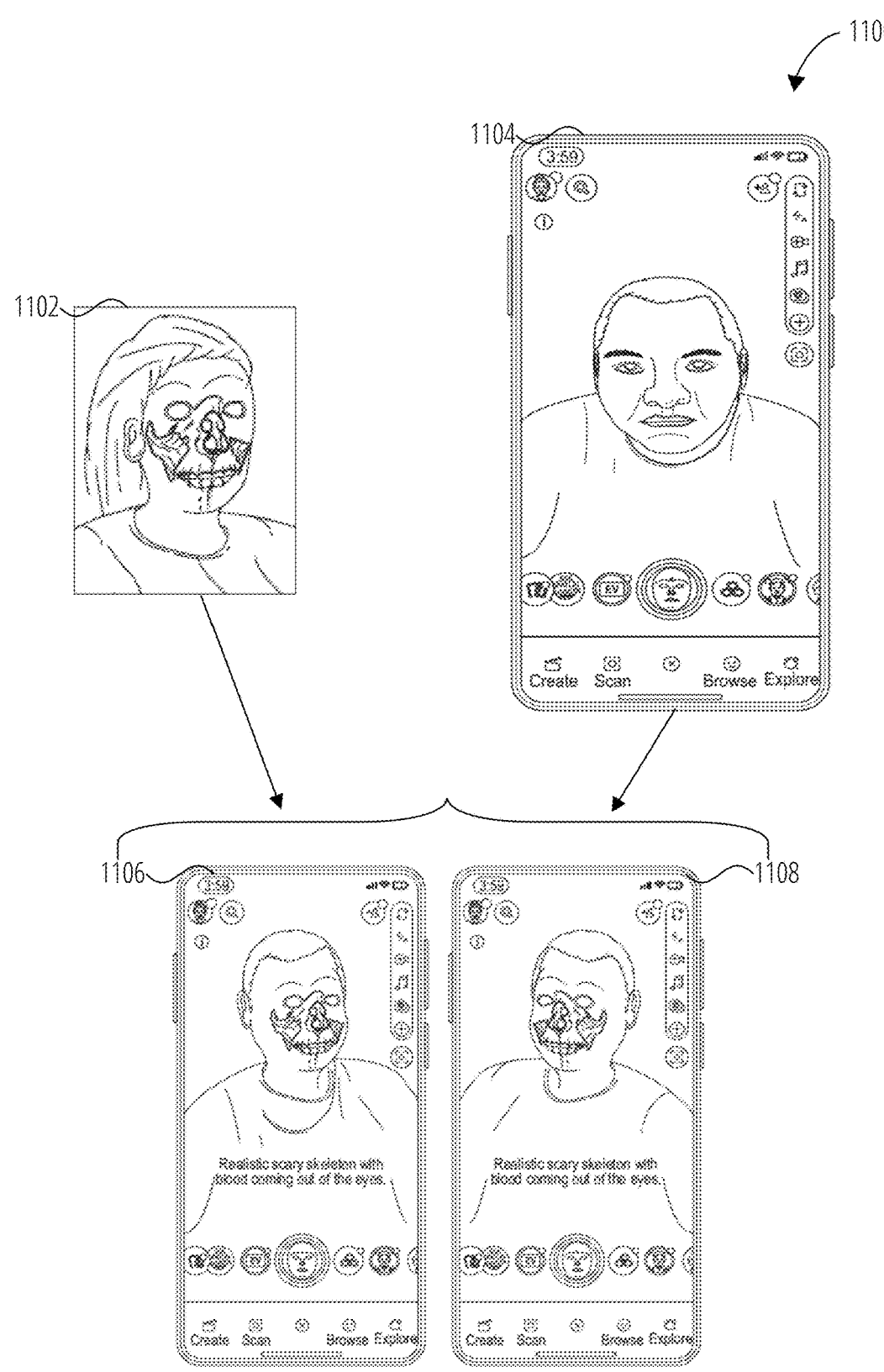
FIG. 11 illustrates an example of recommending content augmentations based on an input image, according to some examples.

FIG. 11 illustrates an example 1100 of recommending content augmentations based on an input image, according to some examples. The interaction system detects an initiation of an interaction function, such as the user selecting an image 1102 on a mobile application.

The interaction system then analyzes the image 1102 using a first machine learning model to generate a feature vector. The feature vector comprises a set of features indicative of characteristics for the interaction function. In the example of FIG. 11, the generated feature vector includes an indication of a facial augmentation adding skeletal features with blood coming out of the eyes.

The interaction system compares the set of features to features corresponding to each of a plurality of content augmentations and identifies a recommended content augmentation based on the comparison. For example, among multiple content augmentations related to adding background balloons, overlaying skeletal features, or modifying a face to look like a pirate, the interaction system identifies that the feature vector for the overlaying of skeletal features are most similar to the feature vector of the image 1102.

The interaction system receives a live camera feed 1104 from a user's mobile device, and applies the content augmentation to the live camera feed. In the example of FIG. 11, the computing device displays the skeletal features overlaid on top of the user's face regardless of whether the user is looking to the right in the live camera feed 1106 or to the left in the live camera feed 1008.

Data Communications Architecture

Figure 12:
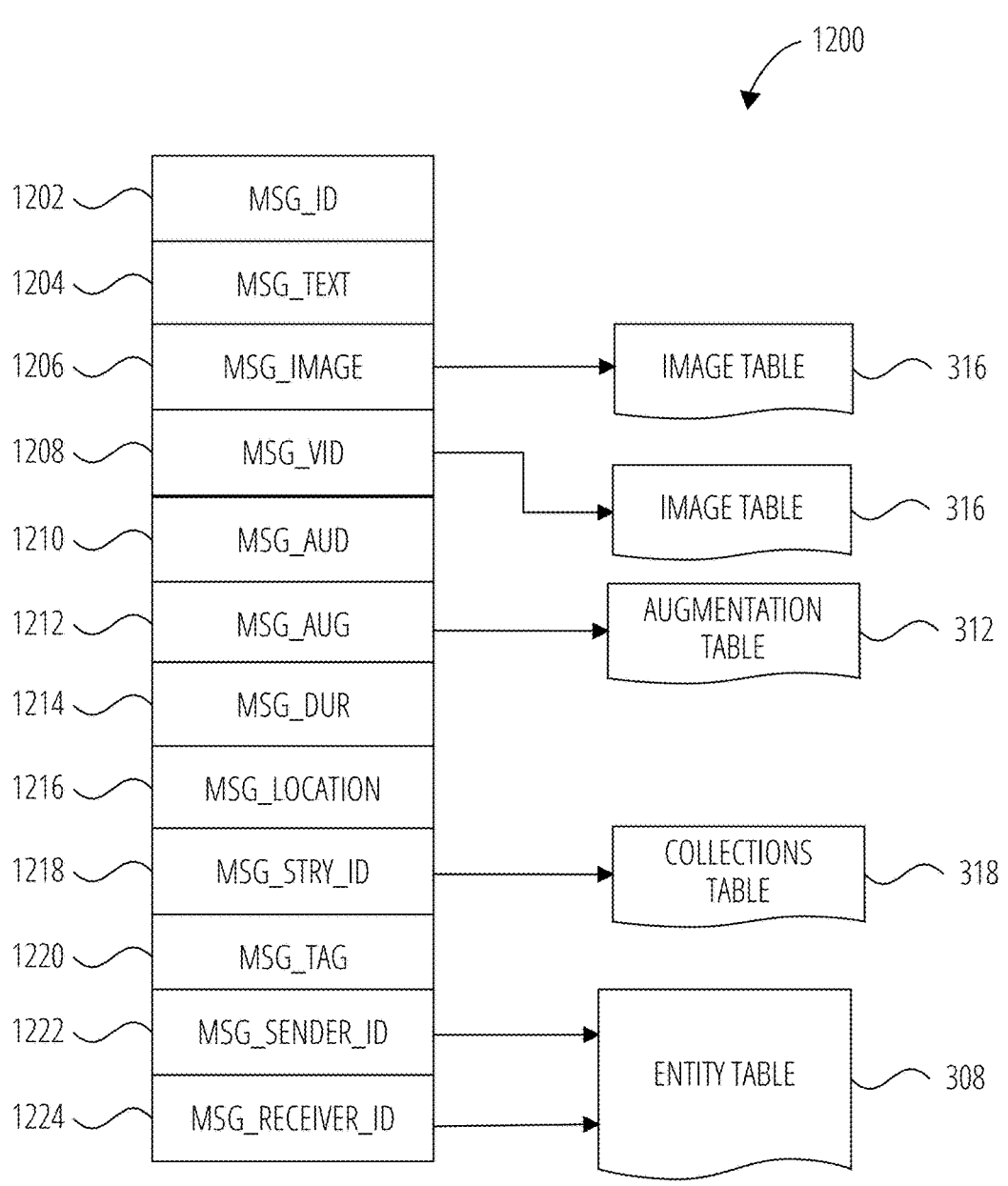
FIG. 12 is a diagrammatic representation of a message, according to some examples.

FIG. 12 is a schematic diagram illustrating a structure of a message 1200, according to some examples, generated by an interaction client 104 for communication to a further interaction client 104 via the interaction servers 124. The content of a particular message 1200 is used to populate the message table 306 stored within the database 304, accessible by the interaction servers 124. Similarly, the content of a message 1200 is stored in memory as "in-transit" or "in-flight" data of the user system 102 or the interaction servers 124. A message 1200 is shown to include the following example components:

Message identifier 1202: a unique identifier that identifies the message 1200.

Message text payload 1204: text, to be generated by a user via a user interface of the user system 102, and that is included in the message 1200.

Message image payload 1206: image data, captured by a camera component of a user system 102 or retrieved from a memory component of a user system 102, and that is included in the message 1200. Image data for a sent or received message 1200 may be stored in the image table 316.

Message video payload 1208: video data, captured by a camera component or retrieved from a memory component of the user system 102, and that is included in the message 1200. Video data for a sent or received message 1200 may be stored in the image table 316.

Message audio payload 1210: audio data, captured by a microphone or retrieved from a memory component of the user system 102, and that is included in the message 1200.

Message augmentation data 1212: augmentation data (e.g., filters, stickers, or other annotations or enhancements) that represents augmentations to be applied to message image payload 1206, message video payload 1208, or message audio payload 1210 of the message 1200. Augmentation data for a sent or received message 1200 may be stored in the augmentation table 312.

Message duration parameter 1214: parameter value indicating, in seconds, the amount of time for which content of the message (e.g., the message image payload 1206, message video payload 1208, message audio payload 1210) is to be presented or made accessible to a user via the interaction client 104.

Message geolocation parameter 1216: geolocation data (e.g., latitudinal and longitudinal coordinates) associated with the content payload of the message. Multiple message geolocation parameter 1216 values may be included in the payload, each of these parameter values being associated with respect to content items included in the content (e.g., a specific image within the message image payload 1206, or a specific video in the message video payload 1208).

Message story identifier 1218: identifier values identifying one or more content collections (e.g., "stories" identified in the collections table 318) with which a particular content item in the message image payload 1206 of the message 1200 is associated. For example, multiple images within the message image payload 1206 may each be associated with multiple content collections using identifier values.

Message tag 1220: each message 1200 may be tagged with multiple tags, each of which is indicative of the subject matter of content included in the message payload. For example, where a particular image included in the message image payload 1206 depicts an animal (e.g., a lion), a tag value may be included within the message tag 1220 that is indicative of the relevant animal. Tag values may be generated manually, based on user input, or may be automatically generated using, for example, image recognition.

Message sender identifier 1222: an identifier (e.g., a messaging system identifier, email address, or device identifier) indicative of a user of the user system 102 on which the message 1200 was generated and from which the message 1200 was sent.

Message receiver identifier 1224: an identifier (e.g., a messaging system identifier, email address, or device identifier) indicative of a user of the user system 102 to which the message 1200 is addressed.

The contents (e.g., values) of the various components of message 1200 may be pointers to locations in tables within which content data values are stored. For example, an image value in the message image payload 1206 may be a pointer to (or address of) a location within an image table 316. Similarly, values within the message video payload 1208 may point to data stored within an image table 316 or video table 314, values stored within the message augmentation data 1212 may point to data stored in an augmentation table 312, values stored within the message story identifier 1218 may point to data stored in a collections table 318, and values stored within the message sender identifier 1222 and the message receiver identifier 1224 may point to user records stored within an entity table 308.

System with Head-Wearable Apparatus

Figure 13:
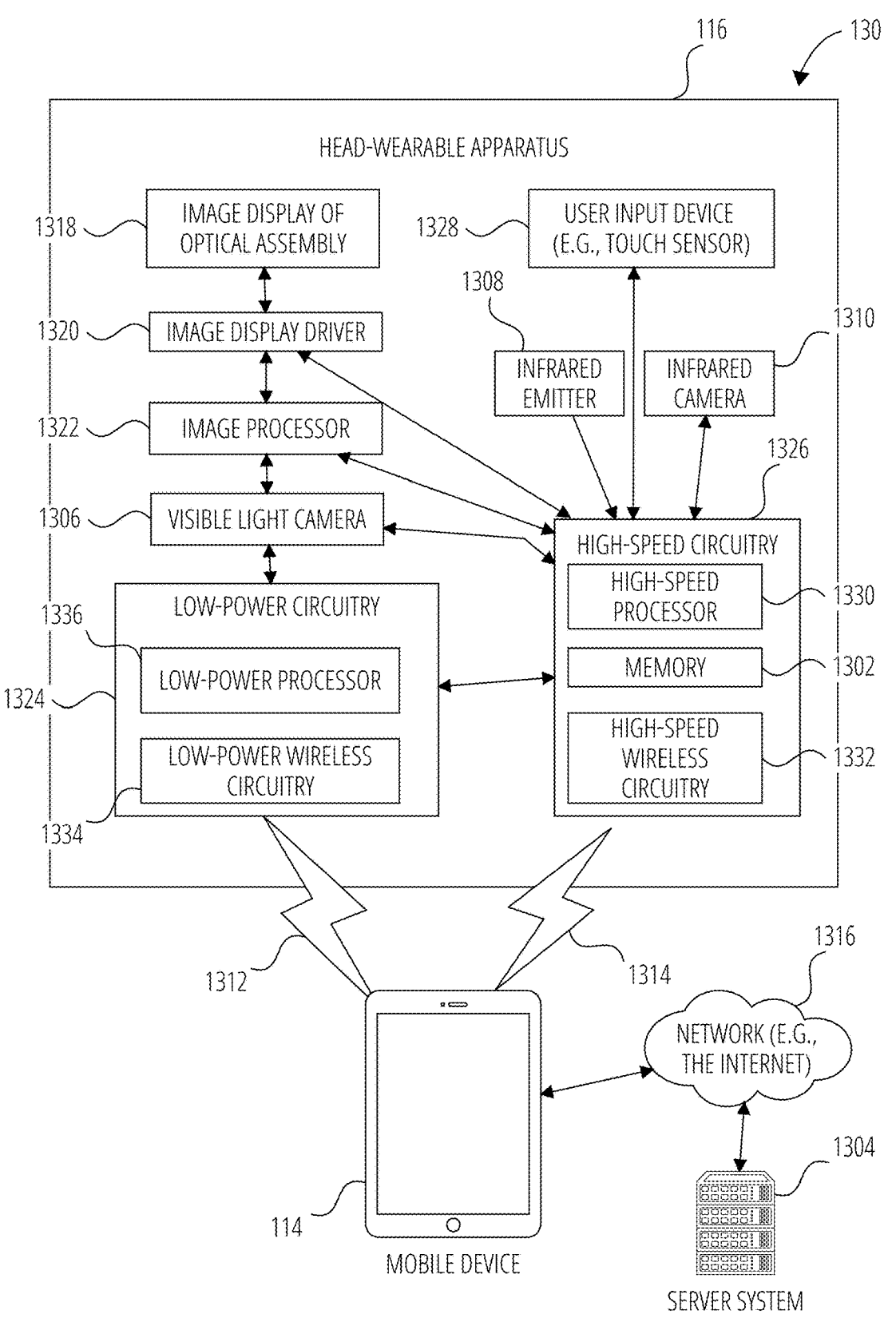
FIG. 13 illustrates a head-wearable apparatus, according to some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 108. The networks 108 may include any combination of wired and wireless connections.

The head-wearable apparatus 116 includes one or more cameras, each of which may be, for example, a visible light camera 1306, an infrared emitter 1308, and an infrared camera 1310.

An interaction client, such as a mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of the image display of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a graphical user interface to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the graphical user interface of the presented image.

The components shown in FIG. 13 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 116. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WI-FI®. In some examples, other high-speed communications standards may be implemented by the high-speed wireless circuitry 1332.

The low-power wireless circuitry 1334 and the high-speed wireless circuitry 1332 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318. While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or the low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 116 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection 1312, or high-speed wireless connection 1314. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections

1312 and high-speed wireless connection 1314 from the mobile device 114 via the low-power wireless circuitry 1334 or high-speed wireless circuitry 1332.

Machine Architecture

Figure 14:
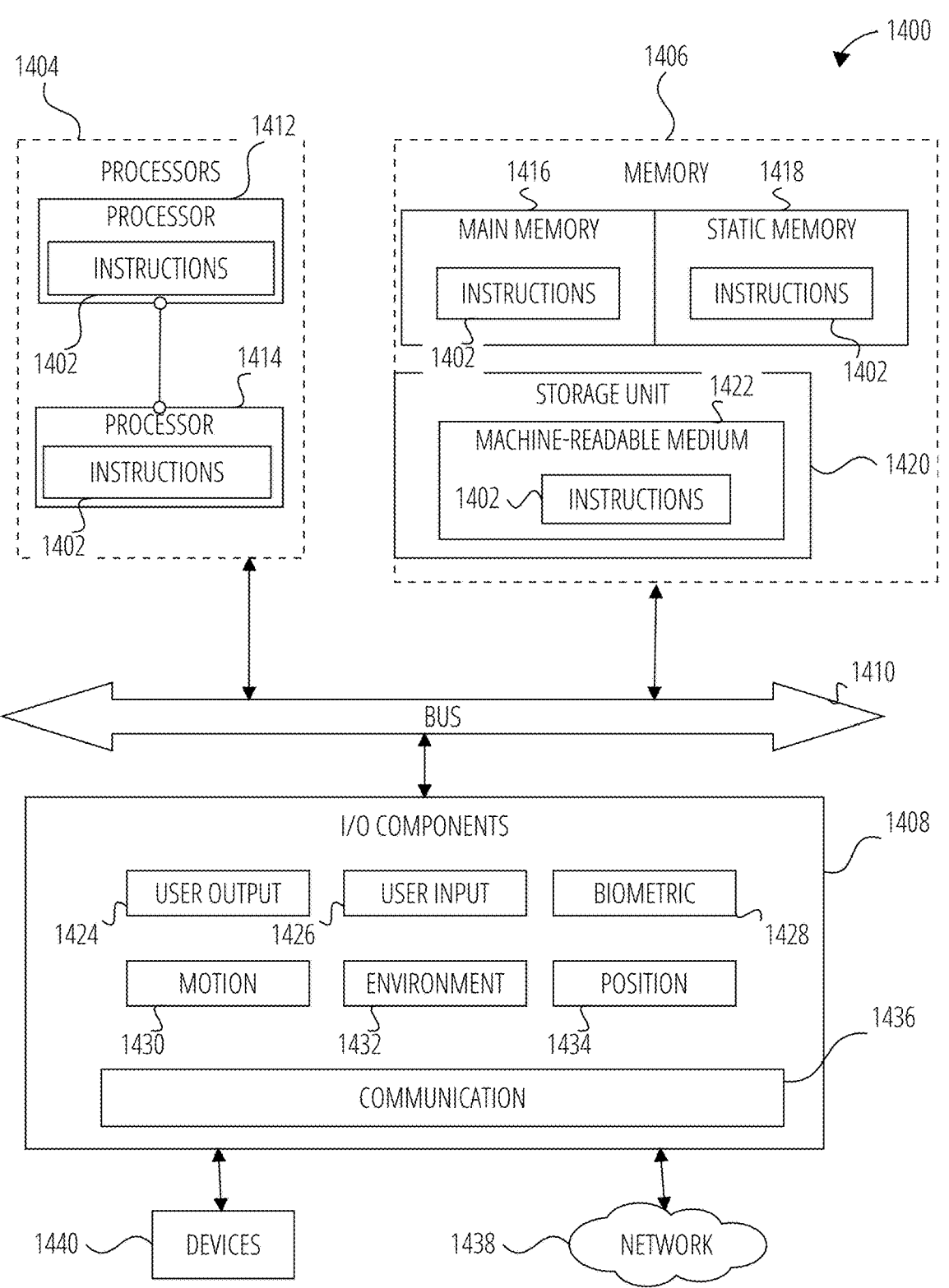
FIG. 14 is a diagrammatic representation of a machine in the form of a computer system within which a set of instructions may be executed to cause the machine to perform any one or more of the methodologies discussed herein, according to some examples.

FIG. 14 is a diagrammatic representation of the machine 1400 within which instructions 1402 (e.g., software, a program, an application, an applet, an app, or other executable code) for causing the machine 1400 to perform any one or more of the methodologies discussed herein may be executed. For example, the instructions 1402 may cause the machine 1400 to execute any one or more of the methods described herein. The instructions 1402 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1402, sequentially or otherwise, that specify actions to be taken by the machine 1400. Further, while a single machine 1400 is illustrated, the term "machine" shall also be taken to include a collection of machines that individually or jointly execute the instructions 1402 to perform any one or more of the methodologies discussed herein. The machine 1400, for example, may comprise the user system 102 or any one of multiple server devices forming part of the interaction server system 110. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1408, which may be configured to communicate with each other via a bus 1410. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that execute the instructions 1402. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1416, a static memory 1418, and a storage unit 1420, both accessible to the processors 1404 via the bus 1410. The main memory 1406, the static memory 1418, and storage unit 1420 store the instructions 1402 embodying any one or more of the methodologies or functions described herein. The instructions 1402 may also reside, completely or partially, within the main memory 1416, within the static memory 1418, within machine-readable medium 1422 within the storage unit 1420, within at least one of the processors 1404 (e.g., within the processor's cache memory), or any suitable combination thereof, during execution thereof by the machine 1400.

The I/O components 1408 may include a wide variety of components to receive input, provide output, produce output, transmit information, exchange information, capture measurements, and so on. The specific I/O components 1408 that are included in a particular machine will depend on the type of machine. For example, portable machines such as mobile phones may include a touch input device or other such input mechanisms, while a headless server machine will likely not include such a touch input device. It will be appreciated that the I/O components 1408 may include many other components that are not shown in FIG. 14. In various examples, the I/O components 1408 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1408 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1430 include acceleration sensor components (e.g., accelerometer), gravitation sensor components, and rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1408 further include communication components 1436 operable to couple the machine 1400 to a network 1438 or devices 1440 via respective coupling or connections. For example, the communication components 1436 may include a network interface component or another suitable device to interface with the network 1438. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1440 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multidimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1416, static memory 1418, and memory of the processors 1404) and storage unit 1420 may store one or more sets of instructions and data structures (e.g., software) embodying or used by any one or more of the methodologies or functions described herein. These instructions (e.g., the instructions 1402), when executed by processors 1404, cause various operations to implement the disclosed examples.

The instructions 1402 may be transmitted or received over the network 1438, using a transmission medium, via a network interface device (e.g., a network interface component included in the communication components 1436) and using any one of several well-known transfer protocols (e.g., hypertext transfer protocol (HTTP)). Similarly, the instructions 1402 may be transmitted or received using a transmission medium via a coupling (e.g., a peer-to-peer coupling) to the devices 1440.

Software Architecture

Figure 15:
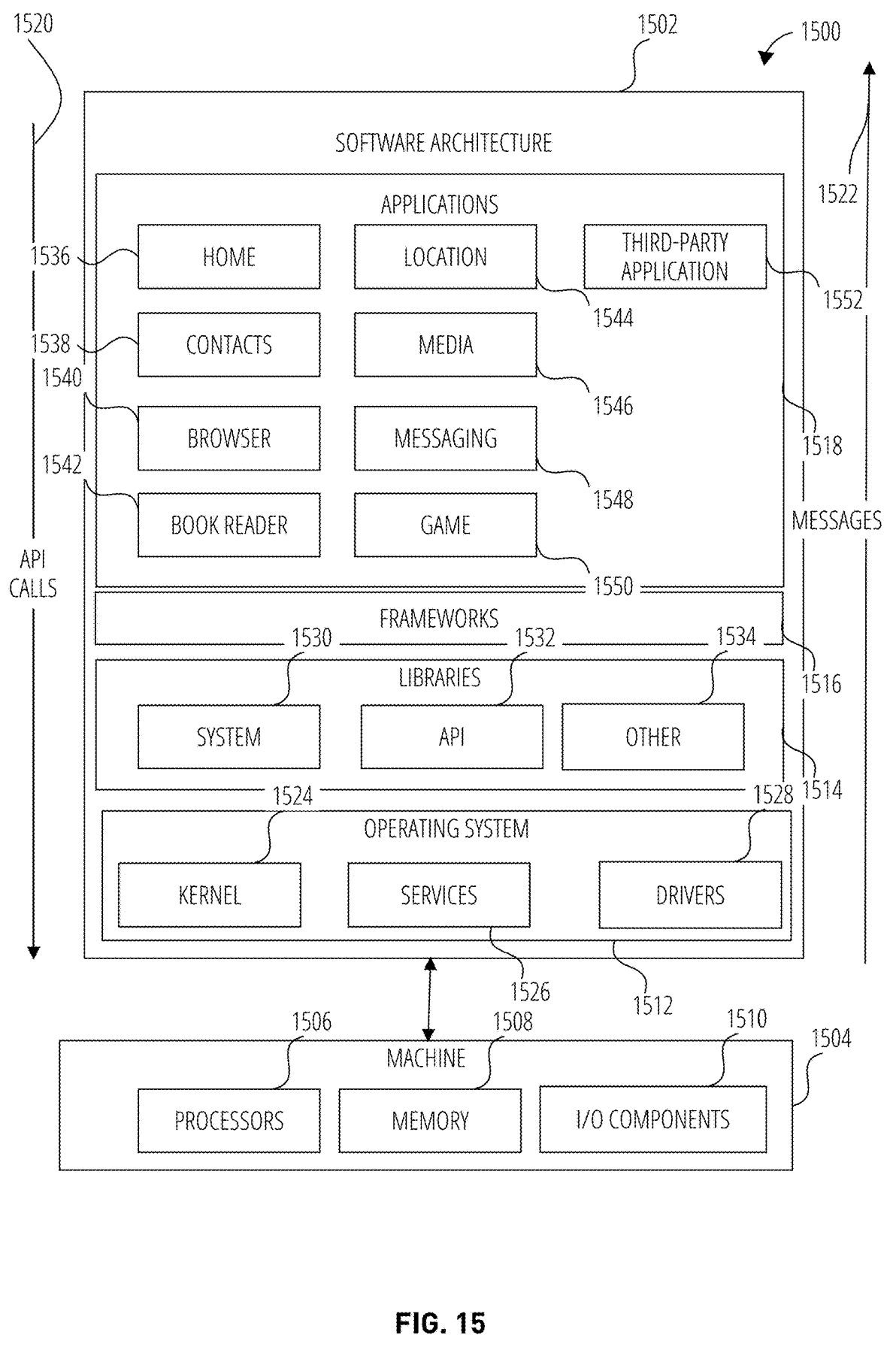

FIG. 15 is a block diagram 1500 illustrating a software architecture 1502, which can be installed on any one or more of the devices described herein. The software architecture 1502 is supported by hardware such as a machine 1504 that includes processors 1506, memory 1508, and I/O components 1510. In this example, the software architecture 1502 can be conceptualized as a stack of layers, where each layer provides a particular functionality. The software architecture 1502 includes layers such as an operating system 1512, libraries 1514, frameworks 1516, and applications 1518. Operationally, the applications 1518 invoke API calls 1520 through the software stack and receive messages 1522 in response to the API calls 1520.

The operating system 1512 manages hardware resources and provides common services. The operating system 1512 includes, for example, a kernel 1524, services 1526, and drivers 1528. The kernel 1524 acts as an abstraction layer between the hardware and the other software layers. For example, the kernel 1524 provides memory management, processor management (e.g., scheduling), component management, networking, and security settings, among other functionalities. The services 1526 can provide other common services for the other software layers. The drivers 1528 are responsible for controlling or interfacing with the underlying hardware. For instance, the drivers 1528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1514 provide a common low-level infrastructure used by the applications 1518. The libraries 1514 can include system libraries 1530 (e.g., C standard library) that provide functions such as memory allocation functions, string manipulation functions, mathematic functions, and the like. In addition, the libraries 1514 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1514 can also include a wide variety of other libraries 1534 to provide many other APIs to the applications 1518.

The frameworks 1516 provide a common high-level infrastructure that is used by the applications 1518. For example, the frameworks 1516 provide various graphical user interface (GUI) functions, high-level resource management, and high-level location services. The frameworks 1516 can provide a broad spectrum of other APIs that can be used by the applications 1518, some of which may be specific to a particular operating system or platform.

In an example, the applications 1518 may include a home application 1536, a contacts application 1538, a browser application 1540, a book reader application 1542, a location application 1544, a media application 1546, a messaging application 1548, a game application 1550, and a broad assortment of other applications such as a third-party application 1552. The applications 1518 are programs that execute functions defined in the programs. Various programming languages can be employed to create one or more of the applications 1518, structured in a variety of manners, such as object-oriented programming languages (e.g., Objective-C, Java, or C++) or procedural programming languages (e.g., C or assembly language). In a specific example, the third-party application 1552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1552 can invoke the API calls 1520 provided by the operating system 1512 to facilitate functionalities described herein.

Machine-Learning Pipeline

Figure 17:
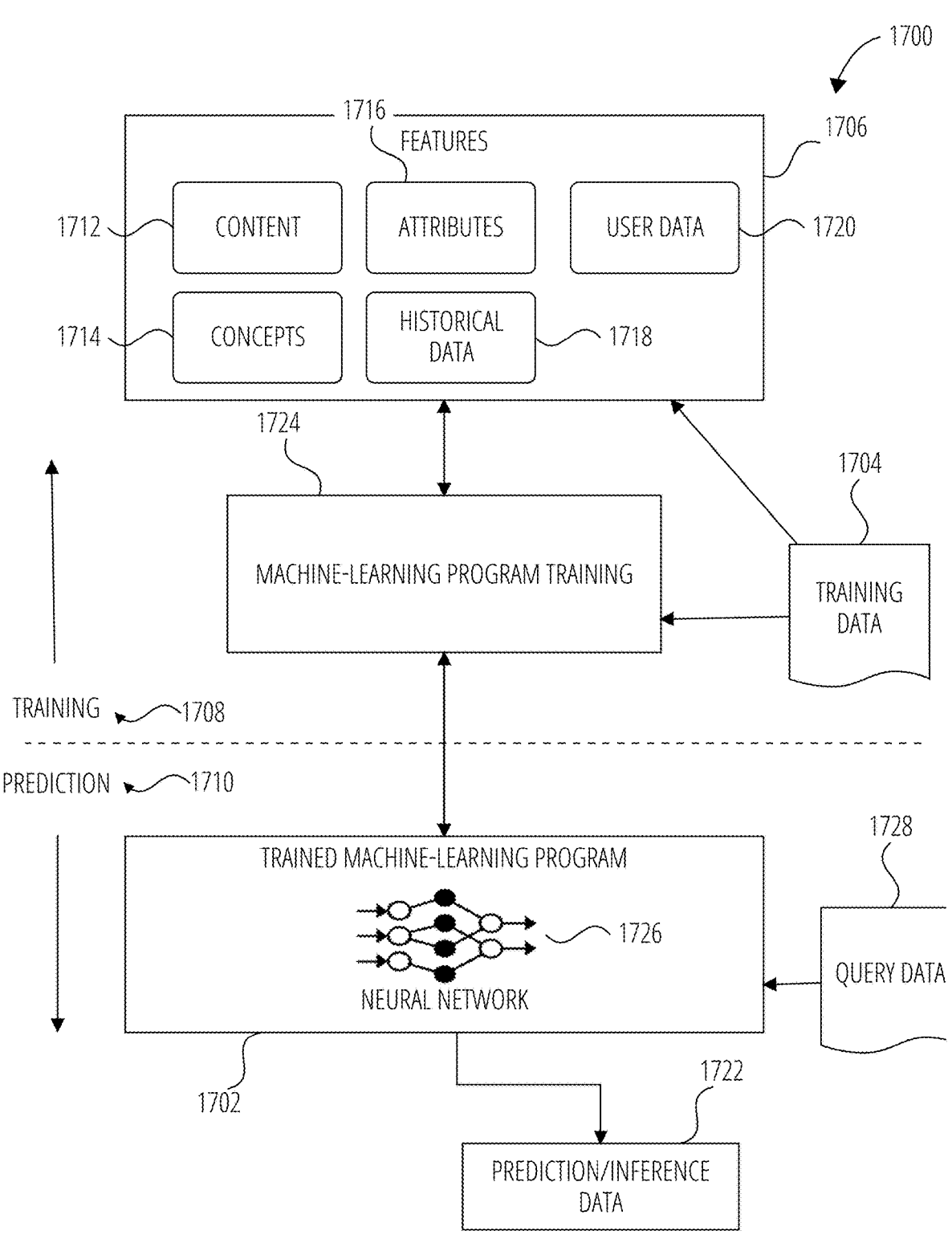
FIG. 17 illustrates training and use of a machine-learning program, according to some examples.

FIG. 17 is a flowchart depicting a machine-learning pipeline 1700, according to some examples. The machine-learning pipelines 1700 may be used to generate a trained model, for example the trained machine-learning program 1702 of FIG. 17, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 16:
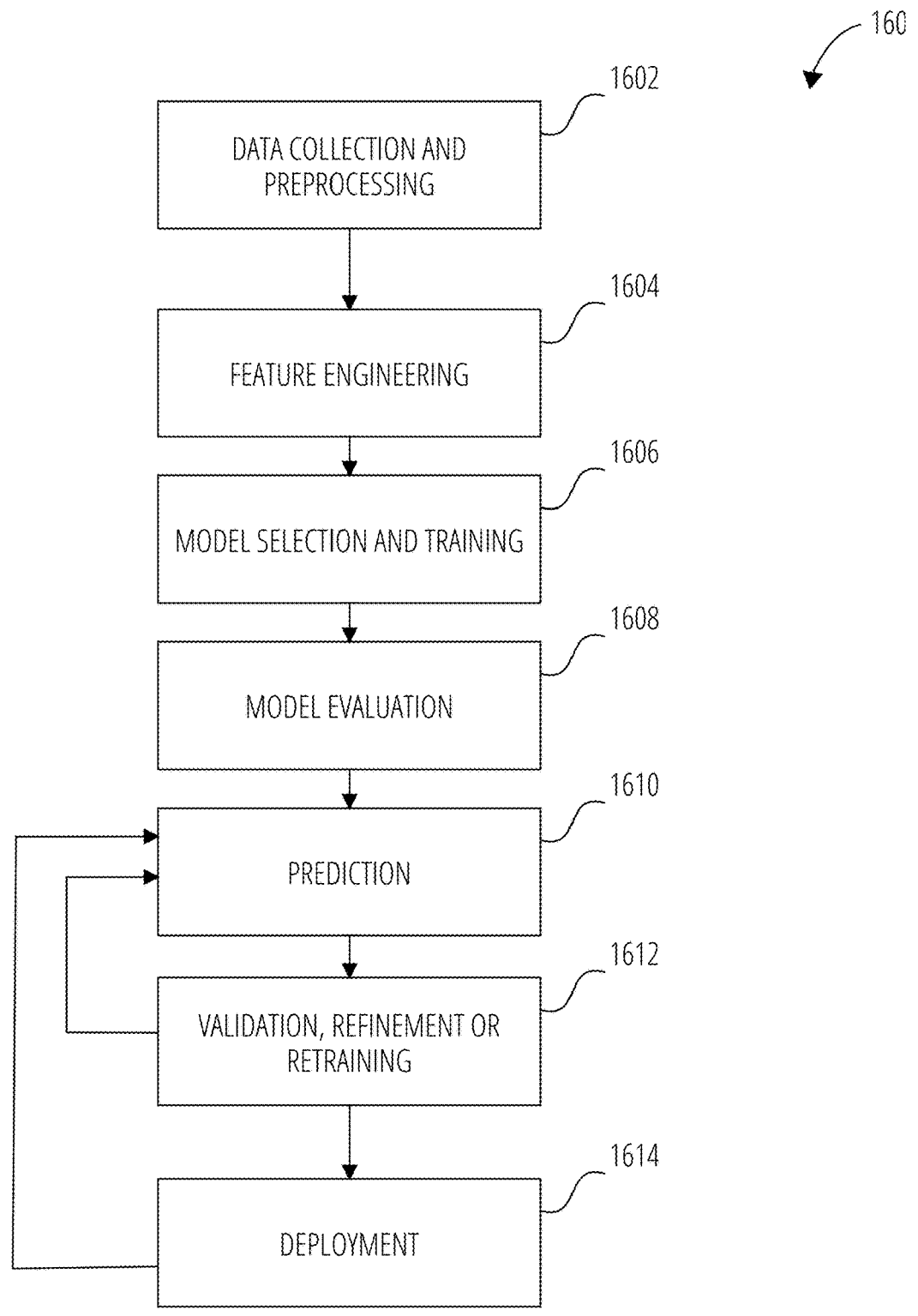
FIG. 16 illustrates a machine-learning pipeline, according to some examples.

Generating a trained machine-learning program 1702 may include multiple types of phases that form part of the machine-learning pipeline 1700, including for example the following phases 1600 illustrated in FIG. 16:

Data collection and preprocessing 1602: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.

Feature engineering 1604: This may include selecting and transforming the training data 1704 to create features that are useful for predicting the target variable. Feature engineering may include (1) receiving features 1706 (e.g., as structured or labeled data in supervised learning) and/or (2) identifying features 1706 (e.g., unstructured or unlabeled data for unsupervised learning) in training data 1704.

Model selection and training 1606: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation 1608: This may include evaluating the performance of a trained model (e.g., the trained machine-learning program 1702) on a separate testing dataset. This can help determine if the model is overfitting or underfitting and if it is suitable for deployment.

Prediction 1610: This involves using a trained model (e.g., trained machine-learning program 1702) to generate predictions on new, unseen data.

Validation, refinement or retraining 1612: This may include updating a model based on feedback generated from the prediction phase, such as new data or user feedback.

Deployment 1614: This may include integrating the trained model (e.g., the trained machine-learning program 1702) into a larger system or application, such as a web service, mobile app, or IoT device. This can involve setting up APIs, building a user interface, and ensuring that the model is scalable and can handle large volumes of data.

FIG. 17 illustrates two example phases, namely a training phase 1708 (part of the model selection and trainings 1606) and a prediction phase 1710 (part of prediction 1610). Prior to the training phase 1708, feature engineering 1604 is used to identify features 1706. This may include identifying informative, discriminating, and independent features for the effective operation of the trained machine-learning program 1702 in pattern recognition, classification, and regression. In some examples, the training data 1704 includes labeled data, which is known data for pre-identified features 1706 and one or more outcomes.

Each of the features 1706 may be a variable or attribute, such as individual measurable property of a process, article, system, or phenomenon represented by a data set (e.g., the training data 1704). Features 1706 may also be of different types, such as numeric features, strings, vectors, matrices, encodings, and graphs, and may include one or more of content 1712, concepts 1714, attributes 1716, historical data 1718 and/or user data 1720, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1708, the machine-learning pipeline 1700 uses the training data 1704 to find correlations among the features 1706 that affect a predicted outcome or prediction/inference data 1722.

With the training data 1704 and the identified features 1706, the trained machine-learning program 1702 is trained during the training phase 1708 during machine-learning program training 1724. The machine-learning program training 1724 appraises values of the features 1706 as they correlate to the training data 1704. The result of the training is the trained machine-learning program 1702 (e.g., a trained or learned model).

Further, the training phase 1708 may involve machine learning, in which the training data 1704 is structured (e.g., labeled during preprocessing operations), and the trained machine-learning program 1702 implements a relatively simple neural network 1726 capable of performing, for example, classification and clustering operations. In other examples, the training phase 1708 may involve deep learning, in which the training data 1704 is unstructured, and the trained machine-learning program 1702 implements a deep neural network 1726 that is able to perform both feature extraction and classification/clustering operations.

A neural network 1726 may, in some examples, be generated during the training phase 1708, and implemented within the trained machine-learning program 1702. The neural network 1726 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1726 operationally computes a small function, such as an activation function, that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1726 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1708, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1726 is iteratively trained by adjusting model parameters to minimize a specific loss function or maximize a certain objective. The system can continue to train the neural network 1726 by adjusting parameters based on the output of the validation, refinement, or retraining block 1612, and rerun the prediction 1610 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1726 even after deployment 1614 of the neural network 1726. The neural network 1726 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1710, the trained machine-learning program 1702 uses the features 1706 for analyzing query data 1728 to generate inferences. outcomes or predictions, as examples of a prediction/inference data 1722. For example, during prediction phase 1710, the trained machine-learning program 1702 is used to generate an output. Query data 1728 is provided as an input to the trained machine-learning program 1702, and the trained machine-learning program 1702 generates the prediction/inference data 1722 as output, responsive to receipt of the query data 1728. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1702 may be a generative AI model. Generative AI is a term that may refer to any type of artificial intelligence that can create new content from training data 1704. For example, generative AI can produce text, images, video, audio, code or synthetic data that are similar to the original data but not identical.

Some of the techniques that may be used in generative AI are:

Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.

Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1722 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; at least one memory component storing instructions that, when executed by the at least one processor, cause the at least one processor to perform operations comprising: detecting an initiation of an interaction function via a computing device; analyzing data associated with the interaction function using a first machine learning model to generate a feature vector, wherein the feature vector comprises a set of features indicative of characteristics for the interaction function; comparing the set of features to features corresponding to each of a plurality of content augmentations; identifying at least one recommended content augmentation based on the comparison; and displaying the at least one recommended content augmentation via a display of the computing device.

In Example 2, the subject matter of Example 1 includes, wherein the interaction function is a content augmentation.

In Example 3, the subject matter of Example 2 includes, wherein the operations further comprise: displaying corresponding selectable user interface elements for individual recommended content augmentations; and in response to a user selection of a first selectable user interface element associated with a first recommended content augmentation: applying the first recommended content augmentation to a camera feed from a camera system; and displaying the camera feed with the applied first recommended content augmentation on the computing device.

In Example 4, the subject matter of Example 3 includes, wherein the operations further comprise: displaying a second selectable user interface element; and in response to a user selection of the second selectable user interface element, capturing a picture or video of the camera feed with the applied first recommended content augmentation.

In Example 5, the subject matter of Examples 2-4 includes, wherein at least one feature of the feature vector for the recommended content augmentation includes a digital element, wherein the at least one recommended content augmentation augments, modifies, or overlays content from a camera feed of a camera system with the digital element, wherein the digital element includes at least one of: an image, an animation, or audio.

In Example 6, the subject matter of Examples 2-5 includes, wherein at least one of the set of features include a real-world object, wherein the content augmentation augments, modifies, or overlays one or more digital elements on or relative to the real-world object detected from a camera feed of a camera system.

In Example 7, the subject matter of Examples 2-6 includes, wherein the content augmentation of the interaction function is of a different type than the recommended content augmentation.

In Example 8, the subject matter of Example 7 includes, wherein the features for the content augmentation and the features for the first recommended content augmentation are compared based on the derived feature vectors.

In Example 9, the subject matter of Examples 2-8 includes, wherein the features for the content augmentation include at least one of: a facial effect, object tracking and manipulation, background modification, digital content overlaid onto the real-world, color adjustment, a time-based effect, image distortion, image warping, or an audio effect; wherein features for a first recommended content augmentation of the at least one recommended content augmentation include at least one of: a facial effect, object tracking and manipulation, background modification, digital content overlaid onto the real-world, color adjustment, a time-based effect, image distortion, image warping, or an audio effect, wherein the features for the content augmentation is different than the features for the first recommended content augmentation.

In Example 10, the subject matter of Examples 2-9 includes, wherein identifying the at least one recommended content augmentation includes: determining a distance metric to measure a similarity between content augmentations in feature space; calculating a distance between the content augmentation and individual content augmentations of a plurality of content augmentations based on corresponding feature vectors and the distance metric, wherein the plurality of content augmentations include the at least one recommended content augmentation; determining that the at least one recommended content augmentation has a smallest distance; and selecting the at least one recommended content augmentation to display on the computing device.

In Example 11, the subject matter of Examples 2-10 includes, wherein the feature vector for the content augmentation includes one or more audio features and one or more video features.

In Example 12, the subject matter of Examples 2-11 includes, wherein the interaction function further comprises a captured video of a camera feed with the content augmentation applied to the camera feed.

In Example 13, the subject matter of Examples 2-12 includes, wherein the operations further comprise applying the at least one recommended content augmentation to a second machine learning model to generate the feature vector for the at least one recommended content augmentation.

In Example 14, the subject matter of Examples 2-13 includes, wherein the operations further comprise applying the at least one recommended content augmentation to the first machine learning model to generate the feature vector for the at least one recommended content augmentation.

In Example 15, the subject matter of Examples 2-14 includes, wherein the first machine learning model is trained to identify features of content augmentations and place the identified features in individual feature vectors.

In Example 16, the subject matter of Examples 2-15 includes, wherein the operations further comprise: training the first machine learning model by: identifying training content augmentations and corresponding training feature vectors expected for the training content augmentations; applying the training content augmentations to the first machine learning model to receive output feature vectors; compare the output feature vectors with the expected training feature vectors to determine a loss parameter for the first machine learning model; and update a characteristic of the first machine learning model based on the loss parameter.

In Example 17, the subject matter of Examples 1-16 includes, wherein the interaction function includes a user selection of a real-world object from a camera feed of a camera system on the computing device, wherein the at least one recommended content augmentation is an augmentation of the real-world object.

In Example 18, the subject matter of Example 17 includes, wherein the user selection of the real-world object is a press and hold action on a user interface of the computing device of the real-world object.

Example 19 is a method comprising: determining an initiation of an interaction function from a user of an interaction system; processing data associated with the interaction function using a first machine learning model to generate a feature vector, wherein the feature vector comprises a set of features indicative of characteristics for the interaction function; identifying at least one recommended content augmentation based on a comparison of the feature vector for the interaction function to a feature vector for the at least one recommended content augmentation; and displaying the at least one recommended content augmentation to the user.

Example 20 is a non-transitory computer-readable storage medium storing instructions that, when executed by at least one processor, cause the at least one processor to perform operations comprising: determining an initiation of an interaction function from a user of an interaction system; processing data associated with the interaction function using a first machine learning model to generate a feature vector, wherein the feature vector comprises a set of features indicative of characteristics for the interaction function; identifying at least one recommended content augmentation based on a comparison of the feature vector for the interaction function to a feature vector for the at least one recommended content augmentation; and displaying the at least one recommended content augmentation to the user.

Example 21 is at least one machine-readable medium including instructions that, when executed by processing circuitry, cause the processing circuitry to perform operations to implement any of Examples 1-20.

Example 22 is an apparatus comprising means to implement of any of Examples 1-20.

Example 23 is a system to implement any of Examples 1-20.

Example 24 is a method to implement any of Examples 1-20.

GLOSSARY

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor;
   at least one memory component storing instructions that, when executed by the at least one processor, cause the at least one processor to perform operations comprising:
      detecting an initiation of an interaction function via a computing device, the interaction function including a user selection of a real-world object from a camera feed of a camera system;
      analyzing data associated with an image of the real-world object using a first machine learning model to generate a feature vector for the image of the real-world object, wherein the feature vector comprises a set of features indicative of characteristics for the real-world object;
      comparing the set of features to features corresponding to each of a plurality of content augmentations;
      identifying at least one recommended content augmentation based on the comparison with the set of features associated with the image of the real-world object that indicates a similarity match between the recommended content augmentation and the real-world object; and
      displaying the at least one recommended content augmentation by applying a visual effect onto at least the real-world object via a display of the computing device.

2. The system of claim 1, wherein the interaction function is a content augmentation.

3. The system of claim 2, wherein the operations further comprise:
   displaying corresponding selectable user interface elements for individual recommended content augmentations; and
   in response to a user selection of a first selectable user interface element associated with a first recommended content augmentation:
   applying the first recommended content augmentation to a camera feed from a camera system; and
   displaying the camera feed with the applied first recommended content augmentation on the computing device.

4. The system of claim 3, wherein the operations further comprise:
   displaying a second selectable user interface element; and
   in response to a user selection of the second selectable user interface element, capturing a picture or video of the camera feed with the applied first recommended content augmentation.

5. The system of claim 2, wherein at least one feature of the feature vector for the recommended content augmentation includes a digital element, wherein the at least one recommended content augmentation augments, modifies, or overlays content from a camera feed of a camera system with the digital element, wherein the digital element includes at least one of: an image, an animation, or audio.

6. The system of claim 2, wherein at least one of the set of features include a real-world object, wherein the content augmentation augments, modifies, or overlays one or more digital elements on or relative to the real-world object detected from a camera feed of a camera system.

7. The system of claim 2, wherein the content augmentation of the interaction function is of a different type than the recommended content augmentation.

8. The system of claim 7, wherein the features for the content augmentation and the features for the first recommended content augmentation are compared based on the derived feature vectors.

9. The system of claim 2, wherein the features for the content augmentation include at least one of: a facial effect, object tracking and manipulation, background modification, digital content overlaid onto the real-world, color adjustment, a time-based effect, image distortion, image warping, or an audio effect; wherein features for a first recommended content augmentation of the at least one recommended content augmentation include at least one of: a facial effect, object tracking and manipulation, background modification, digital content overlaid onto the real-world, color adjustment, a time-based effect, image distortion, image warping, or an audio effect, wherein the features for the content augmentation is different than the features for the first recommended content augmentation.

10. The system of claim 2, wherein identifying the at least one recommended content augmentation includes:

determining a distance metric to measure a similarity between content augmentations in feature space;

calculating a distance between the content augmentation and individual content augmentations of a plurality of content augmentations based on corresponding feature vectors and the distance metric, wherein the plurality of content augmentations include the at least one recommended content augmentation;

determining that the at least one recommended content augmentation has a smallest distance; and selecting the at least one recommended content augmentation to display on the computing device.

11. The system of claim 2, wherein the feature vector for the content augmentation includes one or more audio features and one or more video features.

12. The system of claim 2, wherein the interaction function further comprises a captured video of a camera feed with the content augmentation applied to the camera feed.

13. The system of claim 2, wherein the operations further comprise applying the at least one recommended content augmentation to a second machine learning model to generate the feature vector for the at least one recommended content augmentation.

14. The system of claim 2, wherein the operations further comprise applying the at least one recommended content augmentation to the first machine learning model to generate the feature vector for the at least one recommended content augmentation.

15. The system of claim 2, wherein the first machine learning model is trained to identify features of content augmentations and place the identified features in individual feature vectors.

16. The system of claim 2, wherein the operations further comprise:

training the first machine learning model by:

identifying training content augmentations and corresponding training feature vectors expected for the training content augmentations;

applying the training content augmentations to the first machine learning model to receive output feature vectors;

compare the output feature vectors with the expected training feature vectors to determine a loss parameter for the first machine learning model; and update a characteristic of the first machine learning model based on the loss parameter.

17. The system of claim 1, wherein the interaction function includes a user selection of a real-world object from a camera feed of a camera system on the computing device, wherein the at least one recommended content augmentation is an augmentation of the real-world object.

18. The system of claim 17, wherein the user selection of the real-world object is a press and hold action on a user interface of the computing device of the real-world object.

19. A method comprising:

detecting an initiation of an interaction function via a computing device, the interaction function including a user selection of a real-world object from a camera feed of a camera system;

analyzing data associated with an image of the real-world object using a first machine learning model to generate a feature vector for the image of the real-world object, wherein the feature vector comprises a set of features indicative of characteristics for the real-world object;

comparing the set of features to features corresponding to each of a plurality of content augmentations;

identifying at least one recommended content augmentation based on the comparison with the set of features associated with the image of the real-world object that indicates a similarity match between the recommended content augmentation and the real-world object; and displaying the at least one recommended content augmentation by applying a visual effect onto at least the real-world object via a display of the computing device.

20. A non-transitory computer-readable storage medium storing instructions that, when executed by at least one processor, cause the at least one processor to perform operations comprising:

detecting an initiation of an interaction function via a computing device, the interaction function including a user selection of a real-world object from a camera feed of a camera system;

analyzing data associated with an image of the real-world object using a first machine learning model to generate a feature vector for the image of the real-world object, wherein the feature vector comprises a set of features indicative of characteristics for the real-world object;

comparing the set of features to features corresponding to each of a plurality of content augmentations;

identifying at least one recommended content augmentation based on the comparison with the set of features associated with the image of the real-world object that indicates a similarity match between the recommended content augmentation and the real-world object; and displaying the at least one recommended content augmentation by applying a visual effect onto at least the real-world object via a display of the computing device.

* * * * *